(12) United States Patent
Chan et al.

(10) Patent No.: US 11,880,352 B2
(45) Date of Patent: *Jan. 23, 2024

(54) STORING AND VERIFICATION OF DERIVATIVE WORK DATA ON BLOCKCHAIN WITH ORIGINAL WORK DATA

(71) Applicant: eBay, Inc., San Jose, CA (US)

(72) Inventors: Michael Chan, San Jose, CA (US); Derek Chamorro, Austin, TX (US); Arpit Jain, Milpitas, CA (US); Venkata Siva Vijayendra Bhamidipati, Milpitas, CA (US)

(73) Assignee: eBay, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,876

(22) Filed: Mar. 4, 2022

(65) Prior Publication Data

US 2022/0207019 A1 Jun. 30, 2022

Related U.S. Application Data

(63) Continuation of application No. 16/155,448, filed on Oct. 9, 2018, now Pat. No. 11,301,452.

(51) Int. Cl.
*G06F 16/23* (2019.01)
*H04L 9/06* (2006.01)
*H04L 9/00* (2022.01)

(52) U.S. Cl.
CPC ...... *G06F 16/2365* (2019.01); *G06F 16/2379* (2019.01); *H04L 9/0637* (2013.01); *H04L 9/50* (2022.05)

(58) Field of Classification Search
CPC ............ G06F 16/2365; G06F 16/2379; H04L 9/0637; H04L 9/50; H04L 2209/38;
(Continued)

(56) References Cited

U.S. PATENT DOCUMENTS 5,557,088 A 9/1996 Shimizu et al.
5,607,350 A 3/1997 Levasseur et al.
(Continued)

FOREIGN PATENT DOCUMENTS

CN 106130738 A 11/2016
CN 106777923 A 5/2017
(Continued)

OTHER PUBLICATIONS

A Tech Startup Wants to Use Blockchain to Make Event Tickets Fraud-Proof, Retrieved from the Internet URL: <https://www.forbes.com/sites/forbestreptalks/2017/06/15/a-tech-startup-upgraded-wants-to-use-blockchain-to-make-event-tickets-fraud-proof-and-to-sell-more-stuff-to-fans/#41659e3a7ffa>, Jun. 15, 2017, 5 pages.

(Continued)

*Primary Examiner* — Phong H Nguyen
(74) *Attorney, Agent, or Firm* — Shook, Hardy & Bacon L.L.P.

(57) ABSTRACT

Disclosed is technology for storing original work data on a derivative work data blockchain along with code for verifying that derivative work data is derivative of the original work data. The technology involves receiving derivative work data from a submitting entity along with proof data showing that the derivative work is derivative of the original work. If the derivative work data is verified as derivative, then the derivative work data is appended to the derivative work data blockchain.

20 Claims, 22 Drawing Sheets

(58) Field of Classification Search
CPC ............. H04L 2209/605; H04L 9/3239; H04L 2209/603; H04L 9/3297
USPC .................. 707/690, 758, 769; 709/225, 229
See application file for complete search history.

(56) References Cited

U.S. PATENT DOCUMENTS

| | | |
|---|---|---|
| 7,627,531 B2 | 12/2009 | Breck et al. |
| 7,656,271 B2 | 2/2010 | Ehrman et al. |
| 9,635,000 B1 | 4/2017 | Muftic |
| 9,641,342 B2 | 5/2017 | Sriram et al. |
| 9,680,799 B2 | 6/2017 | Iyer et al. |
| 9,749,140 B2 | 8/2017 | Oberhauser et al. |
| 9,749,297 B2 | 8/2017 | Gvili |
| 9,774,578 B1 | 9/2017 | Ateniese et al. |
| 9,794,074 B2 | 10/2017 | Toll et al. |
| 9,830,593 B2 | 11/2017 | Myers |
| 10,419,225 B2 | 9/2019 | Deery et al. |
| 10,523,443 B1 | 12/2019 | Kleinman |
| 10,657,595 B2 | 5/2020 | De Jong et al. |
| 10,715,323 B2 | 7/2020 | Chan et al. |
| 10,891,384 B2 | 1/2021 | Van De et al. |
| 11,301,452 B2 | 4/2022 | Chan et al. |
| 2004/0024688 A1 | 2/2004 | Bi et al. |
| 2006/0100965 A1 | 5/2006 | Simelius |
| 2013/0174272 A1 | 7/2013 | Chevalier et al. |
| 2013/0219458 A1 | 8/2013 | Ramanathan |
| 2015/0302400 A1 | 10/2015 | Metral |
| 2015/0310424 A1* | 10/2015 | Myers ............... G06Q 20/401 705/69 |
| 2015/0332283 A1 | 11/2015 | Witchey |
| 2016/0028552 A1 | 1/2016 | Spanos et al. |
| 2016/0191243 A1 | 6/2016 | Manning |
| 2016/0203572 A1 | 7/2016 | Mcconaghy et al. |
| 2016/0284033 A1 | 9/2016 | Winand |
| 2016/0300234 A1 | 10/2016 | Moss-pultz et al. |
| 2016/0321752 A1 | 11/2016 | Tabacco |
| 2016/0330034 A1 | 11/2016 | Back et al. |
| 2016/0335533 A1 | 11/2016 | Davis |
| 2016/0342976 A1 | 11/2016 | Davis |
| 2016/0342977 A1 | 11/2016 | Lam |
| 2016/0358184 A1 | 12/2016 | Radocchia et al. |
| 2016/0379212 A1 | 12/2016 | Bowman et al. |
| 2017/0005804 A1 | 1/2017 | Zinder |
| 2017/0011460 A1 | 1/2017 | Molinari et al. |
| 2017/0046526 A1 | 2/2017 | Chan et al. |
| 2017/0046651 A1 | 2/2017 | Lin |
| 2017/0046664 A1 | 2/2017 | Haldenby et al. |
| 2017/0046806 A1 | 2/2017 | Haldenby et al. |
| 2017/0048209 A1 | 2/2017 | Lohe et al. |
| 2017/0103385 A1 | 4/2017 | Wilson et al. |
| 2017/0103390 A1 | 4/2017 | Wilson et al. |
| 2017/0109735 A1 | 4/2017 | Sheng et al. |
| 2017/0116693 A1 | 4/2017 | Rae |
| 2017/0132630 A1 | 5/2017 | Castinado et al. |
| 2017/0149560 A1 | 5/2017 | Shah |
| 2017/0177898 A1 | 6/2017 | Dillenberger |
| 2017/0213210 A1 | 7/2017 | Kravitz et al. |
| 2017/0232300 A1 | 8/2017 | Tran et al. |
| 2017/0236102 A1 | 8/2017 | Biton |
| 2017/0236103 A1 | 8/2017 | Biton |
| 2017/0236104 A1 | 8/2017 | Biton |
| 2017/0237570 A1 | 8/2017 | Vandervort |
| 2017/0243193 A1 | 8/2017 | Manian et al. |
| 2017/0250796 A1 | 8/2017 | Samid |
| 2017/0300627 A1 | 10/2017 | Giordano et al. |
| 2017/0300928 A1 | 10/2017 | Radocchia et al. |
| 2017/0302663 A1 | 10/2017 | Nainar |
| 2017/0308872 A1 | 10/2017 | Uhr et al. |
| 2017/0317997 A1 | 11/2017 | Smith et al. |
| 2017/0329980 A1 | 11/2017 | Hu et al. |
| 2017/0331810 A1 | 11/2017 | Kurian |
| 2017/0337534 A1 | 11/2017 | Goeringer et al. |
| 2017/0366353 A1 | 12/2017 | Struttmann |
| 2018/0018723 A1 | 1/2018 | Nagla et al. |
| 2018/0025442 A1 | 1/2018 | Isaacson et al. |
| 2018/0108089 A1 | 4/2018 | Jayachandran |
| 2018/0130050 A1 | 5/2018 | Taylor et al. |
| 2018/0158054 A1 | 6/2018 | Ardashev et al. |
| 2018/0167198 A1 | 6/2018 | Muller et al. |
| 2018/0173719 A1 | 6/2018 | Bastide et al. |
| 2018/0181730 A1 | 6/2018 | Lyske |
| 2018/0189528 A1 | 7/2018 | Hanis et al. |
| 2018/0219685 A1* | 8/2018 | Deery ................. H04L 9/3236 |
| 2018/0257306 A1 | 9/2018 | Mattingly et al. |
| 2018/0294957 A1 | 10/2018 | O'brien et al. |
| 2018/0330348 A1 | 11/2018 | Uhr et al. |
| 2018/0330349 A1 | 11/2018 | Uhr et al. |
| 2018/0349621 A1 | 12/2018 | Schvey et al. |
| 2018/0349893 A1 | 12/2018 | Tsai |
| 2019/0013932 A1 | 1/2019 | Maino et al. |
| 2019/0073645 A1* | 3/2019 | Dazin ................. G06Q 20/065 |
| 2019/0102409 A1 | 4/2019 | Shi et al. |
| 2019/0109713 A1 | 4/2019 | Clark et al. |
| 2019/0121988 A1 | 4/2019 | Van De et al. |
| 2019/0132138 A1 | 5/2019 | Finlow-bates et al. |
| 2019/0205558 A1 | 7/2019 | Gonzales, Jr. |
| 2019/0205563 A1 | 7/2019 | Gonzales, Jr. |
| 2019/0205826 A1 | 7/2019 | Hanis et al. |
| 2019/0205870 A1 | 7/2019 | Kamalsky et al. |
| 2019/0205873 A1 | 7/2019 | Kamalsky et al. |
| 2019/0205894 A1 | 7/2019 | Gonzales, Jr. et al. |
| 2019/0207759 A1 | 7/2019 | Chan et al. |
| 2019/0207995 A1 | 7/2019 | Gonzales, Jr. |
| 2019/0279247 A1* | 9/2019 | Finken ................. H04L 9/0637 |
| 2019/0295202 A1* | 9/2019 | Mankovskii ........... G06Q 50/26 |
| 2019/0305937 A1 | 10/2019 | Baykaner et al. |
| 2019/0318117 A1* | 10/2019 | Beecham .............. H04L 9/3239 |
| 2019/0318351 A1 | 10/2019 | Ardashev et al. |
| 2020/0012763 A1 | 1/2020 | Arngren et al. |
| 2020/0084027 A1 | 3/2020 | Duchon et al. |
| 2020/0110821 A1 | 4/2020 | Chan et al. |
| 2020/0119905 A1 | 4/2020 | Revankar et al. |
| 2020/0195436 A1 | 6/2020 | Khan |
| 2020/0211005 A1 | 7/2020 | Bodorik et al. |
| 2020/0235926 A1 | 7/2020 | Chan et al. |

FOREIGN PATENT DOCUMENTS

| | | |
|---|---|---|
| CN | 106920169 A | 7/2017 |
| CN | 107070644 A | 8/2017 |
| CN | 107077682 A | 8/2017 |
| CN | 107086909 A | 8/2017 |
| CN | 107273759 A | 10/2017 |
| CN | 107705114 A | 2/2018 |
| CN | 107798650 A | 3/2018 |
| KR | 10-1781583 B1 | 9/2017 |
| WO | 2016/128567 A1 | 8/2016 |
| WO | 2017/004527 A1 | 1/2017 |
| WO | 2017/006136 A1 | 1/2017 |
| WO | 2017/027900 A1 | 2/2017 |
| WO | 2017/066002 A1 | 4/2017 |
| WO | 2017/090041 A1 | 6/2017 |
| WO | 2017/098519 A1 | 6/2017 |
| WO | 2017/145003 A1 | 8/2017 |
| WO | 2017/145017 A1 | 8/2017 |
| WO | 2017/145047 A1 | 8/2017 |
| WO | 2017/148245 A1 | 9/2017 |
| WO | 2017/153495 A1 | 9/2017 |
| WO | 2017/163069 A1 | 9/2017 |
| WO | 2017/163220 A1 | 9/2017 |
| WO | 2017/178956 A1 | 10/2017 |
| WO | 2017/182601 A1 | 10/2017 |
| WO | 2017/195160 A1 | 11/2017 |
| WO | 2017/196701 A1 | 11/2017 |
| WO | 2018/024061 A1 | 2/2018 |
| WO | 2019/133307 A1 | 7/2019 |
| WO | 2019/133308 A1 | 7/2019 |
| WO | 2019/133309 A1 | 7/2019 |

(56) References Cited

FOREIGN PATENT DOCUMENTS

| WO | 2019/133310 A1 | 7/2019 |
|---|---|---|
| WO | 2020/076535 A1 | 4/2020 |

OTHER PUBLICATIONS

Blockchain in Ticketing. Why do ticketing companies need it?—Softjourn, Retrieved from the Internet URL: <https://softjourn.com/blockchain-in-ticketing>, Accessed on Sep. 11, 2018, 7 pages.

Blockchain Secure Event Ticketing for Music, Festivals and Meetups, Retrieved from the Internet URL: <https://eventchain.io/>, Accessed on Sep. 11, 2018, 9 pages.

Blockchain Startups Take on Ticket Touting, But Will They Gain Traction?, Retrieved from the Internet URL: <https://www.coindesk.com/blockchain-startups-take-ticket-touting-will-gain-traction/>, Jul. 31, 2017, 5 pages.

Blocktix—An Ethereum event hosting platform designed for the real world, Retrieved from the Internet URL: <https://blog.blocktix.io/blocktix-an-ethereum-event-hosting-platform-designed-for-the-real-world-d52f8a838ecc>, Jan. 25, 2017, 3 pages.

Cloudchain—Ticketing Platform Based on Blockchain—Reply, Retrieved from the Internet URL: <http://www.reply.com/en/content/blockchain-ticketing-solution-cloudchain>, Accessed on Sep. 11, 2018, 3 pages.

Craig Srpoule: "Statement regarding Forward-Looking Statements", Retrieved from the Internet URL : <URL:https://www.crowdmachine.com/docs/whitepaper.pdf>, Feb. 1, 2018, 12 pages.

Crypto.Tickets, Retrieved from the Internet URL: <https://blog.crypto.tickets/>, Accessed on Sep. 11, 2018, 2 pages.

Ethereum Wallets are Enabling Transaction Scheduling, Killer Feature, Ethereum News, Retrieved from the Internet URL: <https://www.ccn.com/ethereum-wallets-are-enabling-transaction-scheduling-killer-feature/>, Sep. 18, 2018, 6 pages.

GUTS Tickets—Honest ticketing, Retrieved from the Internet URL: <https://guts.tickets/>, Accessed on Sep. 11, 2018, 9 pages.

The Alarm Service is Now Available on The Testnet, Retrieved from the Internet URL: <http://blog.ethereum-alarm-clock.com/blog/2016/1/16/the-alarm-service-is-now-available-on-the-testnet>, Jan. 16, 2016, 2 pages.

The Aventus Protocol: Blockchain for Ticketing, Retrieved from the Internet URL: <https://aventus.io/>, Accessed on Sep. 11, 2018, 9 pages.

Upgraded Tickets, Retrieved from the Internet URL: <https://www.upgraded-inc.com/>, Accessed on Sep. 11, 2018, 14 pages.

Anonymous, "Is Blockchain The Answer to Copyright Issues?", Retrieved from the Internet URL :<https://medium.com/contentos-io/is-blockchain-the-answer-to-copyright-issues-f93344329295>, May 11, 2018, 3 pages.

Ateniese et al., "Redactable Blockchain - or -Rewriting History in Bitcoin and Friends", IEEE European Symposium on Security and Privacy, May 11, 2017, 38 pages.

Bhargavan et al., "Short Paper: Formal Verification of Smart Contracts", retrieved From Internet URL<http://research.microsoft.com/en-us/um/people/nswamy/papers/solidether.pdf>, Aug. 27, 2016, pp. 1-6.

Bidder Coin, "Bidder Coin, Bidder Coin White Paper", Dec. 28, 2017, 36 pages.

Chainfrog, "What are Smart Contracts?", Retrieved from the Internet URL: <http://www.chainfrog.com/wp-content/uploads/2017/08/smart-contracts.pdf>, 2017, 13 pages.

Chan, "Motif Finding", Retrieved from the Internet URL: <https://www.mathworks.com/matlabcentral/fileexchange/29362-motif-finding>, Nov. 15, 2010, 4 pages.

Chen et al., "Under-Optimized Smart Contracts Devour Your Money", Retrieved from the Internet URL: <https://arxiv.org/pdf/1703.03994.pdf >, Mar. 11, 2016, 5 pages.

Chronologic, "Temporal Innovation on the Blockchain", Retrieved from the Internet URL: <https://chronologic.network/uploads/Chronologic_Whitepaper.pdf>, Oct. 11, 2018, 25 pages.

Ethereum, "blockchain—How can a contract run itself at a later time?", Retrieved from the Internet URL :<https://ethereum.stackexchange.com/questions/42/how-can-a-contract-run-itself-at-a-later-time>, Accesses date on Sep. 24, 2018, 12 pages.

Gipp et al., "CryptSubmit: Introducing Securely Timestamped Manuscript Submission and Peer Review Feedback Using the Blockchain", 2017 ACM/IEEE Joint Conference on Digital Libraries (JCDL). IEEE, Jun. 19, 2017, 4 pages.

Gollapudi,"White Paper—A Next-Generation Smart Contract and Decentralized Application Platform", Retrieved from the Internet URL: < https://github.com/ethereum/wiki/wiki/White-Paper/f18902f4e7fb21dc92b37e8a0963eec4b3f4793a >, May 29, 2017, pp. 1-23.

Huckle et al., "Internet of Things, Blockchain and Shared Economy Applications", Procedia Computer Science. Elsevier B.V. 98: 463., 2016, pp. 461-466.

Kehrli,"Blockchain Explained", Retrieved from the Internet URL: <https://www.niceideas.ch/blockchain_explained.pdf>, Oct. 7, 2016, pp. 1-25.

Kishigami et al., "The Blockchain-Based Digital Content Distribution System", 2015 IEEE Fifth International Conference on Big Data and Cloud Computing, Aug. 1, 2015, pp. 187-190.

Kong et al., "High obfuscation plagiarism detection using multi-feature fusion based on Logical Regression mode", 2015 4th International Conference on Computer Science and Network Technology (ICCSNT), Dec. 19, 2015, 5 pages.

Ramachandran, Ramachandran, "Using Blockchain and smart contracts for secure data provenance management," Sep. 28, 2017, pp. 1-11.

Steichen et al., "Blockchain-Based, Decentralized Access Control for IPFS", Retrieved from the Internet URL: <https://www.researchgate.net/publication/327034734>, Jul. 2018, 9 pages.

Szabo,"Smart Contracts: Building Blocks for Digital Markets", Retrieved online from the Internet URL: <http://www.alamut.com/subj/economics/nick_szabo/smartContracts.html>, 1996, pp. 1-17.

Triantafyllidis,"Developing an Ethereum Blockchain Application", Retrieved from the Internet URL: <http://www.delaat.net/rp/2015-2016/p53/report.pdf >, Feb. 19, 2016, 59 pages.

White Paper,"White Paper: PGP Key Management Server from Symantec", An Introduction to PGP Key Management Server from Symantec, 2010, 17 pages.

Zhang,"Orthogonality Between Key Privacy and Data Privacy", ResearchGate, Revisited, Conference Paper, Aug. 2007, Aug. 2007, 17 pages.

\* cited by examiner

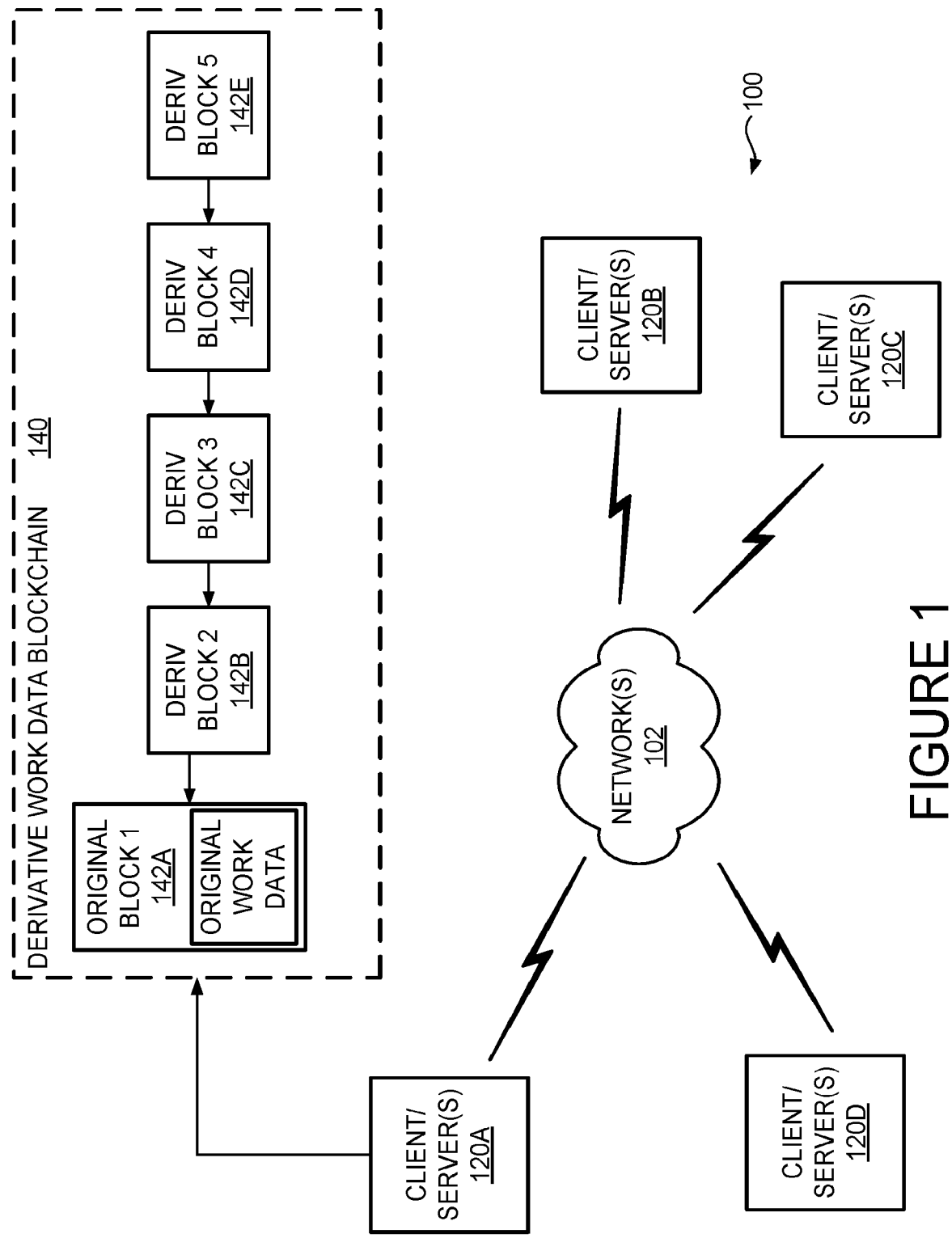

```
DERIVATIVE WORK DATA BLOCK

METHODS
Verify(derivative_work_data, proof_data, Derivative_sourceID,
Submission_sourceID) /* Called by client/server source providing
proof data */
{
        entropy=calculate_entropy(derivative_work_data)
        match=Search_for_match(entropy)
        if(match == TRUE)
                append(derivative_work_data, proof_data,
                        Derivative_sourceID, Submission_sourceID)
                transfer_value(Submission_sourceID)
}

Calculate_entropy(derivative_work_data) /* Calculate entropy
proof data */
{
        entropy_value = generate_signature(derivative_work_data)
        return(entropy_value)
}

Search_for_match(entropy) /* Search for matching proof data */
{
        node= tree_root
        for nodes of tree
                if(node.entropy – entropy < threshold)
                        return(TRUE)
                else
                        node = traverse_tree_next_node
}
```

```
DERIVATIVE WORK DATA BLOCK

METHODS
Verify(derivative_work_data, Derivative_sourceID,
Submission_sourceID) /* Called by client/server source providing proof
data */
{
        match_length=Compare_original_work_data(derivative_work_data)
        if(match_length > MATCH_THRESHOLD)
                append(derivative_work_data,
                        Derivative_sourceID, Submission_sourceID)
                transfer_value(Submission_sourceID)
}

Compare_original_work_data(derivative_work_data) /* Search for
matching data string in original work data.*/
{
        for length from Min_window to Max_window
                search_substring(length) of derivative_work_data
                sliding window search original_work_data for
                        search_substring(length)
                        if found
                                increment length
                        else
                                return length
}
```

```
DERIVATIVE WORK DATA BLOCK

METHODS
Verify(derivative_work_data, key, Derivative_sourceID,
Submission_sourceID) /* Called by client/server source providing key */
{
        /* Get value from trie using key */
        key_value=Search_trie_for match(key)
        if key_value  == derivative_work_data
                append(derivative_work_data, key, Derivative_sourceID,
                    Submission_sourceID)
                transfer_value(Submission_sourceID)
}

Search_trie_for_match(key) /* Search for value matching key in Patricia-
Merkle trie.*/
{
        def search(self, key):
    # Search key in the trie
    # Returns value if key present in trie, else false
    ORIGINAL_WORK.trie_tree = work.trie_tree
    length = len(key)

for level in range(length):
       index = work.char_to_index(key[level])
       if not ORIGINAL_WORK.trie_tree.self.child.nodes[index]:
          return False ORIGINAL_WORK.trie_tree =
            ORIGINAL_WORK.trie_tree.self.child.nodes[index]
    if (ORIGINAL_WORK.trie_tree != None and
          ORIGINAL_WORK.trie_tree != None):
       /* found */
      return ORIGINAL_WORK.trie_tree.self.child.nodes[index].value
    else:
       return FALSE

STORING AND VERIFICATION OF DERIVATIVE WORK DATA ON BLOCKCHAIN WITH ORIGINAL WORK DATA

CROSS-REFERENCE TO RELATED APPLICATIONS

This patent application is a continuation of U.S. patent application Ser. No. 16/155,448, filed Oct. 9, 2018, which is incorporated herein by reference in its entirety.

BACKGROUND

All or parts of copyrighted works can be copied and utilized in derivative works. It can be difficult for the owner of the original work to identify a derivative work that incorporates all or a portion of the original work. It can also be difficult for the owner to track the derivative work along with evidence showing that the derivative work incorporates a portion of the original work. Similarly, it can be difficult for further downstream users to track a derivative work back to the original work.

It is with respect to these and other considerations that the disclosure made herein is presented.

SUMMARY

The disclosed technology is directed toward systems and methods for storing original work data on a derivative work data blockchain along with code for verifying that derivative work data is derivative of the original work data. The technology involves receiving derivative work data from a submitting entity along with proof data showing that the derivative work is derivative of the original work. If the derivative work data is verified as derivative, then the derivative work data is appended to the derivative work data blockchain. The disclosed technology provides approaches to derivative work data management that are reliable, transparent and traceable.

Certain examples of the disclosed technology for storing original work data and searching for derivative works involve receiving original work data and storing the original work data in a blockchain. The technology also involves receiving derivative work data and proof data relating to whether the derivative work data is derivative of the original work data. In response to receiving the derivative work data, the technology involves verifying the received proof data by validating the derivative work data is a derivative of the original work data, appending the derivative work data to the blockchain, and storing the received proof data in the blockchain in association with the original work data.

Examples of the original work data include: source code, object code, an executable, literary text, an audio file, an image file, a video file, a graphical file, a biomedical/health/medical data record, a graphical model, a video game, and genetic data.

In some examples, verifying the received proof data by validating the derivative work data is a derivative of the original work data includes transferring value to an entity from which the proof data is received.

In certain examples, storing the original work data in a blockchain includes: for each of one or more portions of the original work data, calculating an entropy value for the portion of the original work, and storing the calculated entropy value in the blockchain in association with the portion of the original work data. In these example, verifying the received proof data by validating the derivative work is a derivative of the original work involves: calculating an entropy value of at least a portion of the derivative work data, searching the stored entropy values in the blockchain for the one or more portions of the original work data for at least one stored entropy value that is within a threshold difference to the entropy value calculated for the portion of the derivative work data.

In other examples, calculating a first entropy of at least a portion of the original work involves calculating a first entropy signature by analysis of subsets of data within the original work. Calculating a second entropy of at least a portion of the derivative work involves calculating a second entropy signature by analysis of subsets of data within the derivative work. And determining whether the second entropy is within a threshold difference to the first entropy involves comparing the first entropy signature to the second entropy signature to determine whether the second entropy signature is within the threshold difference to the first entropy signature.

In yet other examples, verifying the received proof data by validating the derivative work is a derivative of the original work involves comparing one or more subsets of data in the original work to a subset of data in the derivative work and determining whether a correlation between one of the subsets of data in the original work to the subset of data in the derivative work is within a correlation threshold.

In still other examples, verifying the received proof data by validating the derivative work is a derivative of the original work involves: inputting the original work data to a prediction model trained on differentiation of original works from derivative works; submitting the derivative work data to the prediction model; receiving an output prediction value from the prediction model for the derivative work data; and determining that the derivative work data is derivative of the original work data if the output prediction value meets a prediction threshold value. In further examples, the prediction model can utilize one or more of: a linear regression model, a logistic regression model, a decision tree, a support vector machine, a naïve Bayesian machine, k-means clustering, a gradient booting algorithm, a convolution neural network, a recurrent neural network, and a multi-instance learning algorithm.

In additional examples, the proof data can include a first data fingerprint of the original work and a derivative data fingerprint corresponding to the derivative work. Validating the derivative work data is derivative of the original work involves determining whether the derivative data fingerprint is within a similarity threshold to the first data fingerprint.

In some additional examples, storing the original work data in a blockchain involves storing the original work data in a data structure that includes at least one of a Merkle tree, a Patricia trie, or a modified Merkle Patricia trie and storing the data structure in the blockchain.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 1 is an architectural diagram showing an illustrative example of a system for a derivative work data blockchain;

FIG. 3B is a data architecture diagram showing an illustrative example of a derivative work data block that includes verification code for validating and appending derivative work data involving entropy calculations on the blockchain in accordance with the example of FIG. 3A;

FIG. 3C is a data architecture diagram showing an alternative example of original work data from an origination entity being submitted and stored on a blockchain example where derivative work data is validated by on comparing data from the derivative work to data for the original work and the derivative work data being secured on the blockchain;

FIG. 3E is a data architecture diagram showing an illustrative example of a derivative work data block that includes verification code for validating and appending derivative work data on the blockchain in accordance with the example of FIG. 3D;

DETAILED DESCRIPTION

Figure 2A:
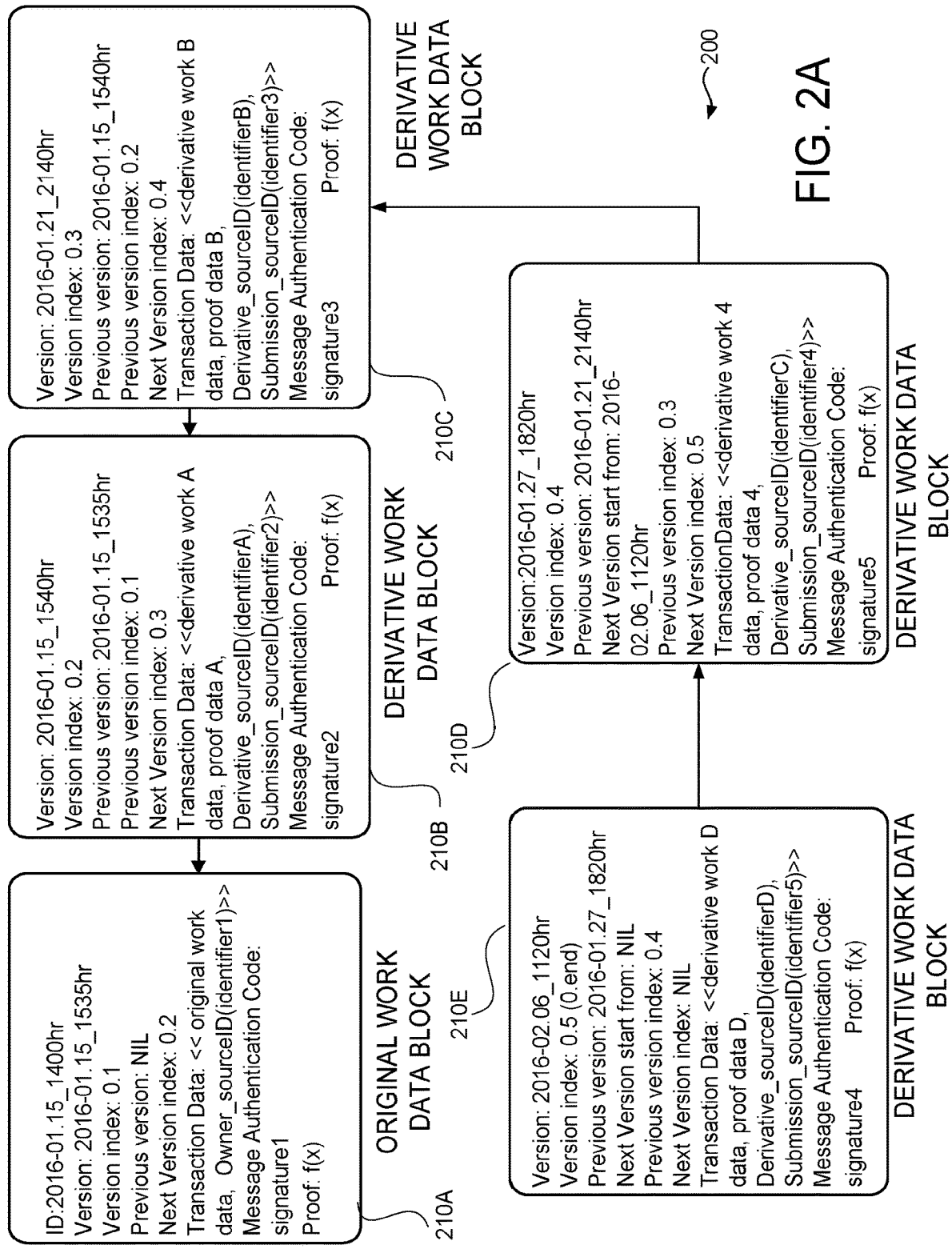
FIG. 2A is a data architecture diagram showing an illustrative example of a derivative work data blockchain with original work data being stored in an original work data block and derivative work data, along with proof data, derivative source identification and submission source identification, being secured with derivative work data blocks added to the derivative work data blockchain.

The following Detailed Description describes technologies for storing original work data in a derivative work data blockchain as well as receiving derivative work data from submitters, validating that the derivative work data is related to the original work data, and storing the derivative work data in the blockchain.

Original work data, such as source code, object code, an executable, literary text, an audio file, an image file, a video file, a graphical file, a biomedical, health or medical data record, a graphical model, a video game, or genetic data, is securely maintained on a blockchain. Derivative work data, e.g. data from a work that utilizes all or a part of the original work data, or proof data can be submitted, validated and securely stored on the blockchain in association with the original work data. The code for validating proof data can be securely maintained on the blockchain and made available for wide access, e.g. public transparency access.

Some implementations that utilize open source or public transparency aspects of blockchain technology can include technology that transfers value to a submitter who provides proof data that is validated as showing that derivative work data is related to the original work data.

Conventionally, it is challenging for an owner of an original work to find and document that all or part of the original work has been utilized by another to create a derivative work. In the vast depth and breadth of cyber space, it can be difficult to locate a derivative work.

It can also be computationally expensive for an owner to develop proof data proving that the derivative work relates to the original work. Non-owners have little motivation to identify derivative works or to develop proof data.

Further, an entity that has created a work identified as being derivative may prefer to see proof data that has been independently created or publicly disclosed. A party seeking to license or otherwise use a derivative work may also benefit from access to independently created or publicly accessible proof data before taking a license or undertaking use.

The disclosed technology can provide transparency, traceability and security for the information and processes used in maintaining original work data and collecting and securely storing proof data showing that another work is derived from the original work. A derivative work data blockchain is utilized to securely store the original work data in a form that can be searched and against which derivative work data can be verified by submitting entities that search for derivative works and develop proof data.

Proof data that is independently developed by submitting entities and showing that derivative work data relates to original work data can be validated and securely stored in the blockchain and made available for access by entities identified as owning or utilizing derivative work or entities seeking to determine whether a work is derivative before licensing or utilizing the work. Submitting entities can be motivated to search for derivative works and develop proof data showing that a derivative work is derived from an original work by transferring value to a submitting entity if the proof data is validated.

These are simplified examples and many factors may be considered in technology for managing derivative work data using a blockchain as will be discussed in greater detail below.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of derivative work data.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

By the use of the technologies described herein, a derivative work data blockchain is used to maintain data for an original work in searchable form. In addition, the derivative work data blockchain is used to collect, validate and securely maintain proof data developed and submitted by a submitting entity showing that another work is derived from the original work. Script code for verifying the proof data, as well as the original work data and the proof data, can be securely maintained and made widely accessible using the blockchain.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for verification and storing of derivative work data on a blockchain with original work data will be described. As will be described in more detail below with respect to the figures, there are a number of applications and services that may embody the functionality and techniques described herein.

FIG. 1 is an architectural diagram showing an illustrative example of a derivative work data management system 100 utilizing a derivative work data blockchain 140 to securely maintain data for an original work along with proof data showing that other works were derived from the original work. In the example of FIG. 1, the derivative work data blockchain 140 can be based on a private blockchain platform or a publicly available blockchain platform, such as ETHEREUM or BITCOIN. Script languages, such as the SOLIDIFY scripting language for ETHEREUM or the SCRIPT language for BITCOIN, can be utilized to implement code for searching original work data as well as submitting, validating and appending derivative work data to the derivative work data blockchain 140 or transferring value to an entity that submits derivative work data to the derivative work data blockchain 140.

An entity that owns or manages an original work uses client/server 120A to initiate derivative work data blockchain 140 by creating original data block 142A, which can be a genesis block for the blockchain. Original data block 142A can include data for an original work stored in searchable form or can provide a root node to a searchable data structure containing the original work data. In the example shown, the client/server 120A provides the original work data for original data block 142A.

In the example of FIG. 1, client/servers 120A, 120B, 120C or 120D can be used to submit proof data to the derivative work data blockchain 140. The client/servers 120 can communicate with one another as well as a network of servers that support and maintain blockchain 140. For example, the ETHERIUM blockchain platform from the ETHERIUM FOUNDATION of Switzerland provides a decentralized, distributed computing platform and operating system that provides scripting functionality.

Proof data submitted to derivative work data blockchain 140 can be validated by scripts maintained on the blockchain and the proof data, when verified, can be appended to derivative work data blockchain 140 in derivative work data blocks 142B, 142C, 142D and 142E in this example. The original work data is securely stored in derivative work data blockchain 140 and can be made accessible to other entities. For example, derivative work data blockchain 140 can be viewable to the public through the use of applications that can access blockchain information. Or, in another example, the derivative work data blockchain 140 can be restricted to being viewable only to client/servers 120 that are identified in blockchain 140. By providing access to the derivative work data blockchain 140, this approach can provide full or partial transparency to the original work data as well as the derivative work data along with the scripts used to verify the derivative work data.

FIG. 2A is a data architecture diagram illustrating a simplified example of a derivative work data blockchain ledger 200 based on the blocks 142A-E of the derivative work data blockchain ledger 140 of FIG. 1. The derivative work data blockchain ledger 200 example of FIG. 2A is simplified to show block headers, metadata and signatures of blocks 210A-E in order to demonstrate storing traceable and secure original and derivative work data using a blockchain. In outline, a blockchain ledger may be a globally shared transactional database.

The blockchain ledger 200 may be arranged as a Merkle tree data structure, as a linked list, or as any similar data structure that allows for cryptographic integrity. The blockchain ledger 200 allows for verification that data has not been corrupted or tampered with because any attempt to tamper will change a Message Authentication Code (or has) of a block, and other blocks pointing to that block will be out of correspondence. In one embodiment of FIG. 2A, each block may point to another block. A block may comprise one or more transactions. Each block may include a pointer to the other block, and a hash (or Message Authentication Code function) of the other block.

Each block in the blockchain ledger may optionally contain a proof data field relating to a proof function performed to verify integrity of data blocks in the blockchain ledger. The proof data field may indicate a reward that is due. The proof may be a proof of work, a proof of stake, a proof of research, or any other data field indicating a reward is due. For example, a proof of work may indicate that computational work was performed. As another example, a proof of stake may indicate that an amount of cryptocurrency has been held for a certain amount of time. For example, if 10 units of cryptocurrency have been held for 10 days, a proof of stake may indicate 10*10=100 time units have accrued. A proof of research may indicate that research has been performed. In one example, a proof of research may indicate that a certain amount of computational work has been performed—such as exploring whether molecules interact a certain way during a computational search for an efficacious drug compound.

The blocks 210 of derivative work data blockchain 200 in the example of FIG. 2A show original work data being securely stored on the blockchain along derivative work data including proof data demonstrating that the derivative work data is derived from the original work data. Derivative work data is secured with a new derivative work data block on the blockchain. In this example, a user who owns or manages an original work uses client/server 120A is to initiate the derivative work data blockchain ledger and secure the original work data. The owner uses client/server 120A to sign the genesis block 210A and the blockchain system within which blockchain 200 is created verifies the genesis data block based on a proof function.

Thereafter, other entities, such as entities using client/servers 120A-D, in this example, can submit proof data purporting to show that a derivative work was derived from all or part of the original work. The proof data is verified using scripts stored within the blocks 210 of the blockchain 200 and, if verified, is appended to the blockchain in a new derivative work data block 210B-E. In this example, each added derivative work data block 210B-E is signed by an entity submitting the proof data and to commit the block to blockchain 200 for verification by the blockchain platform.

Figure 2B:
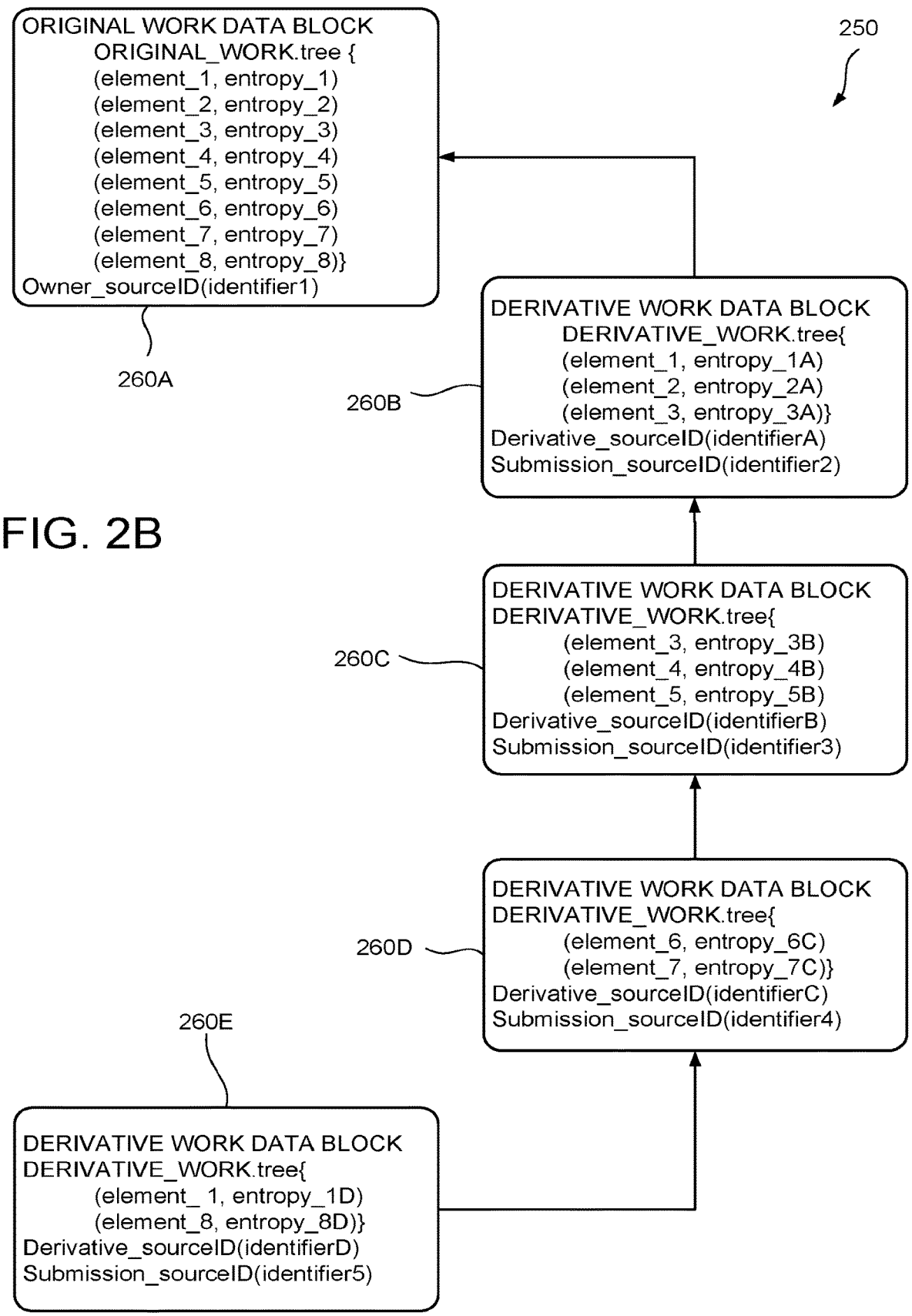
FIG. 2B is a data architecture diagram showing another illustrative example of a derivative work data blockchain where the original work data is decomposed into multiple elements that are stored in the original work data block with a corresponding entropy calculation and each derivative work data block on the blockchain identifies an element of the original work data utilized in a derivative work along with proof data in the form of an entropy calculation for the element in the derivative work, an identifier for a source of the derivative work, and an identifier for a source that identified and submitted the derivative work data.

FIG. 2B is a data architecture diagram showing another illustrative example of a derivative work data blockchain 250 where the original work data is decomposed into multiple elements that are stored in the original work data block with a corresponding entropy calculation. In this example, the original work data is decomposed into elements, e.g. subsections of code or data from the original work, an entropy value is calculated for each element, and the elements and corresponding entropy value is stored in a tree or array structure in original work data block 260A.

An entity, such as a user of client/servers 120A-D, identifies a derivative work and generates proof data in the form of an entropy value calculated for an element of a derivative work. The entity submits one or more element identifiers and proof data in the form of corresponding entropy calculation values, e.g. (element_1, entropy_1A), along with an identifier for the derivative source, e.g. Derivative_sourceID(identifierA), and an identifier for the submitting entity, e.g. Submission_sourceID(identifier2). A verification script verifies that the submitted proof data shows that the submitted element of the derivative work is derived from the original work and stores the derivative work data in a derivative work data block appended to blockchain 250. Subsequent derivative work data submittals are similarly processed and appended to the blockchain.

Figure 2C:
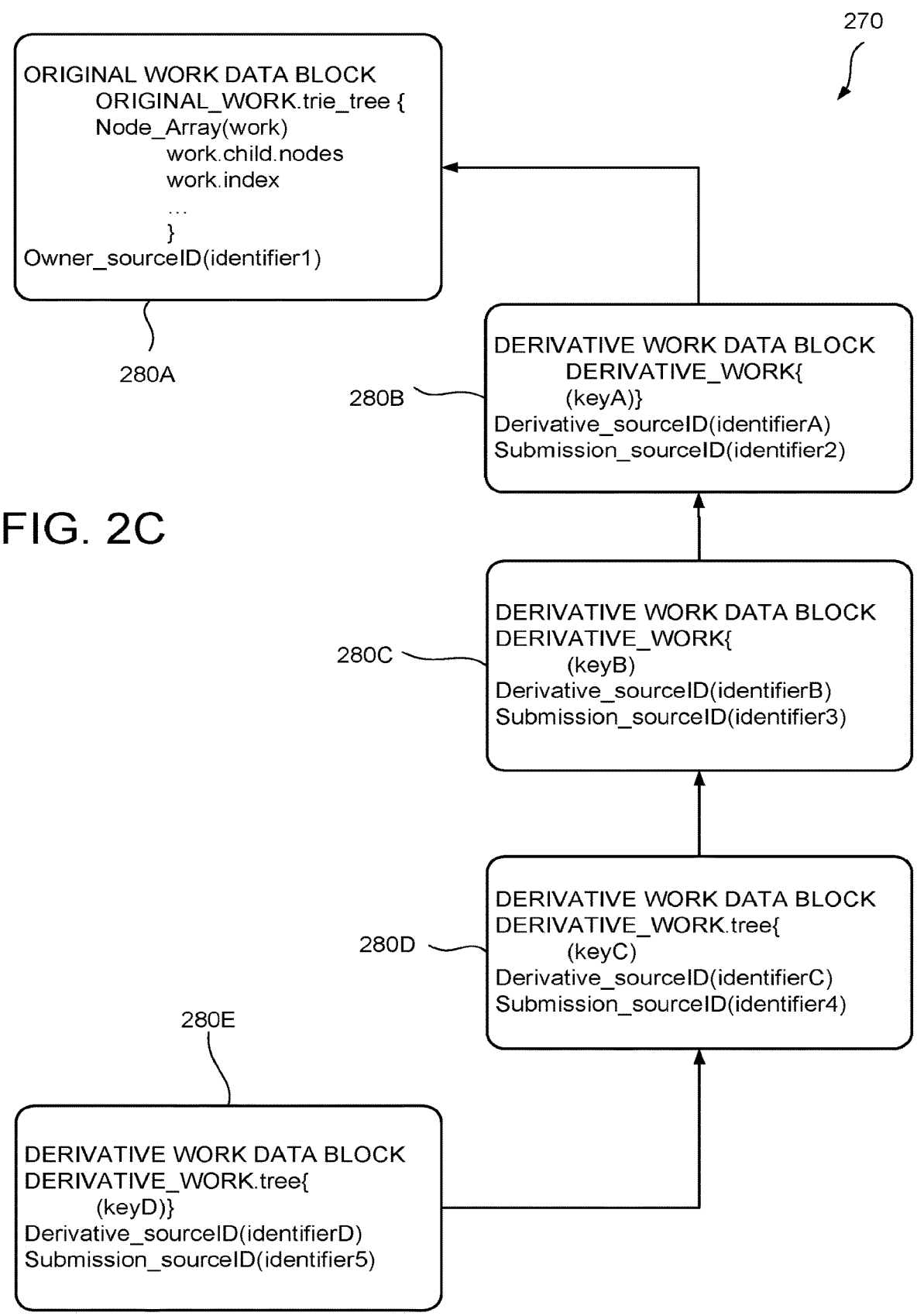
FIG. 2C is a data architecture diagram showing still another illustrative example of a derivative work data blockchain where the original work data is stored in a Merkle Patricia trie in the original work data block and each derivative work data block on the blockchain identifies a key to an element of the original work data utilized in a derivative work along with an identifier for a source of the derivative work and an identifier for a source that identified and submitted the derivative work data.

FIG. 2C is a data architecture diagram showing an illustrative example of a different approach to a derivative work data blockchain 270 where the original work data is stored in a modified Merkle Patricia trie structure in the original work data block 280A. Alternatively, original work data block 280A can be a root node to a modified Merkle Patricia trie structure composed of multiple data blocks.

In this example, an entity, such as a user of client/servers 120A-D, identifies a derivative work and generates proof data in the form of key value that indexes to a leaf node in the Merkle Patricia trie structure pertaining to an element of the original work data. The entity submits a key value, e.g. (keyA), along with an identifier for the derivative source, e.g. Derivative_sourceID(identifierA), and an identifier for the submitting entity, e.g. Submission_sourceID(identifier2). A verification script verifies that the submitted key shows that the submitted element of the derivative work is derived from the original work and stores the derivative work data in a derivative work data block 280B-E appended to blockchain 270. Subsequent derivative work data submittals are similarly processed and appended to the blockchain 270.

Figure 3A:
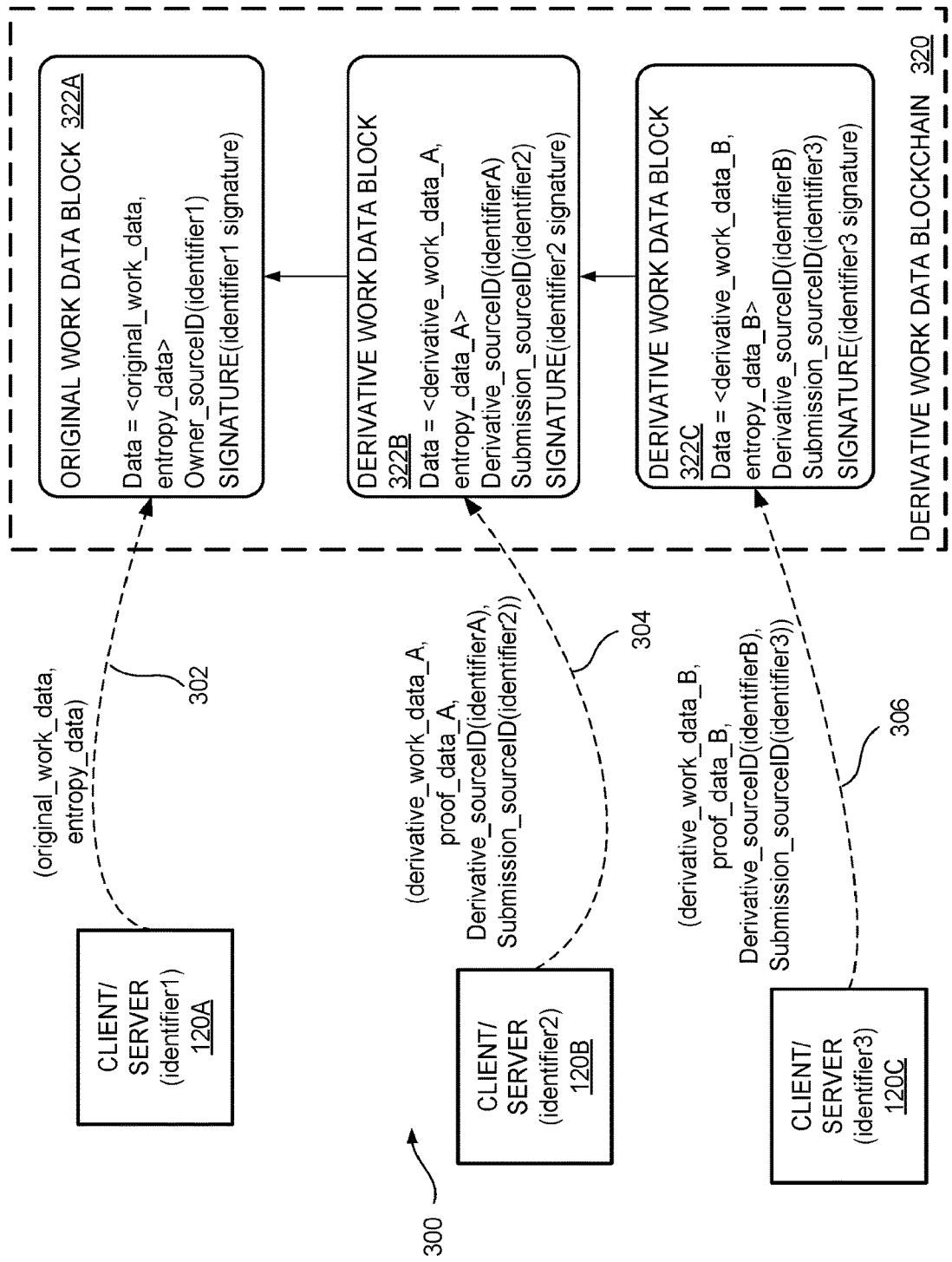
FIG. 3A is a data architecture diagram showing an illustrative example of original work data from an origination entity being submitted and stored on the blockchain example of FIG. 2B and derivative work data being submitted, validated and secured on the blockchain.

FIG. 3A is a data architecture diagram 300 showing an illustrative example of original work data from an origination entity being submitted and stored on a derivative work data blockchain 320 and derivative work data being submitted, validated and secured on the blockchain in accordance with the blockchain example of FIG. 2B.

At 302, an origination entity, e.g. identifier1, using client/server 120A submits original_work_data and entropy_data with values corresponding to elements of original work data that is stored in original work data block 322A along with an identifier for the owner of the original work data, e.g.

Owner_sourceID(identifier1). In this example, the origination entity signs, e.g. SIGNATURE(identifier1 signature), the original work data block 322A to commit the block to the blockchain.

At 304, a submitting entity, e.g. identifier2, using client/server 120B submits derivative_work_data_A, e.g. element identifiers or data from the derivative work itself, along with proof_data_A, e.g. entropy_data_A, along with an identifier for a source of the derivative work, e.g. Derivative_sourceID (identifierA), and an identifier for the submitting entity, e.g. Submission_sourceID(identifier2). The proof data is verified using a verification script secured by blockchain 320 and submitted data is appended to blockchain 320 in derivative work data block 322B.

Similarly, at 306, another submitting entity, e.g. identifier2, using client/server 120C submits derivative_work_data_B, e.g. element identifiers or data from the derivative work itself, along with proof_data_B, e.g. entropy_data_B, along with an identifier for a source of the derivative work, e.g. Derivative_sourceID(identifierB), and an identifier for the submitting entity, e.g. Submission_sourceID (identifier3). The proof data is verified using a verification script secured by blockchain 320 and submitted data is appended to blockchain 320 in derivative work data block 322C.

FIG. 3B is a data architecture diagram showing an illustrative example of a derivative work data block 322B that includes verification code for validating and appending derivative work data involving entropy calculations on a blockchain in accordance with the example of FIG. 3A. The code in block 322B can be executed by a blockchain platform or other host to perform the methods contained in the code.

Block 322B contains a Verify script that, in this example, calculates an entropy value for the submitted derivative_work_data and utilizes the calculated entropy value to search the original_work_data for an element or the original work with a substantially similar entropy value. The Verify script calls a Calculate_entropy script to calculate an entropy value, such as an entropy signature, and calls a Search_for_match script with the calculated entropy value.

The Search_for_match script searches a tree structure containing elements of the original_work_data for an element with an entropy value that is within a predetermined threshold of the entropy value calculated for the derivative_work_data. If a matching entropy element is found, then the script returns TRUE to the Verify script, which creates a derivative work data block with the derivative_work_data, proof_data, Derivative_sourceID, and Submission_sourceID and appends the block to the blockchain.

In this example, if the submitted derivative_work_data is found to match an element of the original_work_data, then a transfer script is called, e.g. transfer_value(Submission_sourceID), to transfer value to the submitting entity as a reward for identifying the derivative work. The reward is provided as a crowd-sourcing incentive to encourage submitting entities to search for derivative works.

Many alternative implementations can be utilized without departing from the scope of the disclosed technology. In one alternative implementation, the derivative_work_data can include an element identifier referencing an element of the original_work_data. The entropy value or signature for the derivative_work_data can then be compared to the entropy value or signature for the element of the original_work_data.

FIG. 3C is a data architecture diagram showing an example of a derivative work data block 322B with another alternative implementation where derivative work data is verified by comparing data from the derivative work to data for the original work and the derivative_work_data being secured on the blockchain. In this example, the Verify script calls a Compare_original_work_data with the received derivative_work_data, which will return a match_length value indicated the number of bytes of data in the derivative_work_data that matches the original_work_data.

The Compare_original_work_data script, in this example, uses a sliding window of the derivative_work_data to compare against the original_work_data starting with a minimum window size, e.g. 256 bytes. When a match is found for the derivative_work_data in the sliding window is found, the length of the window is increased and a search based on the larger window performed. The search continues incrementing the length of the sliding window until the match fails, which establishes the longest length of data window that is matched and the length value is returned to the Verify script.

If the match_length obtained from the Compare_original_work_data script is greater than a predetermined MATCH_THRESHOLD value, then the derivative_work_data is considered verified. The Verify script creates a derivative work data block with the derivative_work_data, Derivative_sourceID, and Submission_sourceID and appends the block to the blockchain.

Figure 3D:
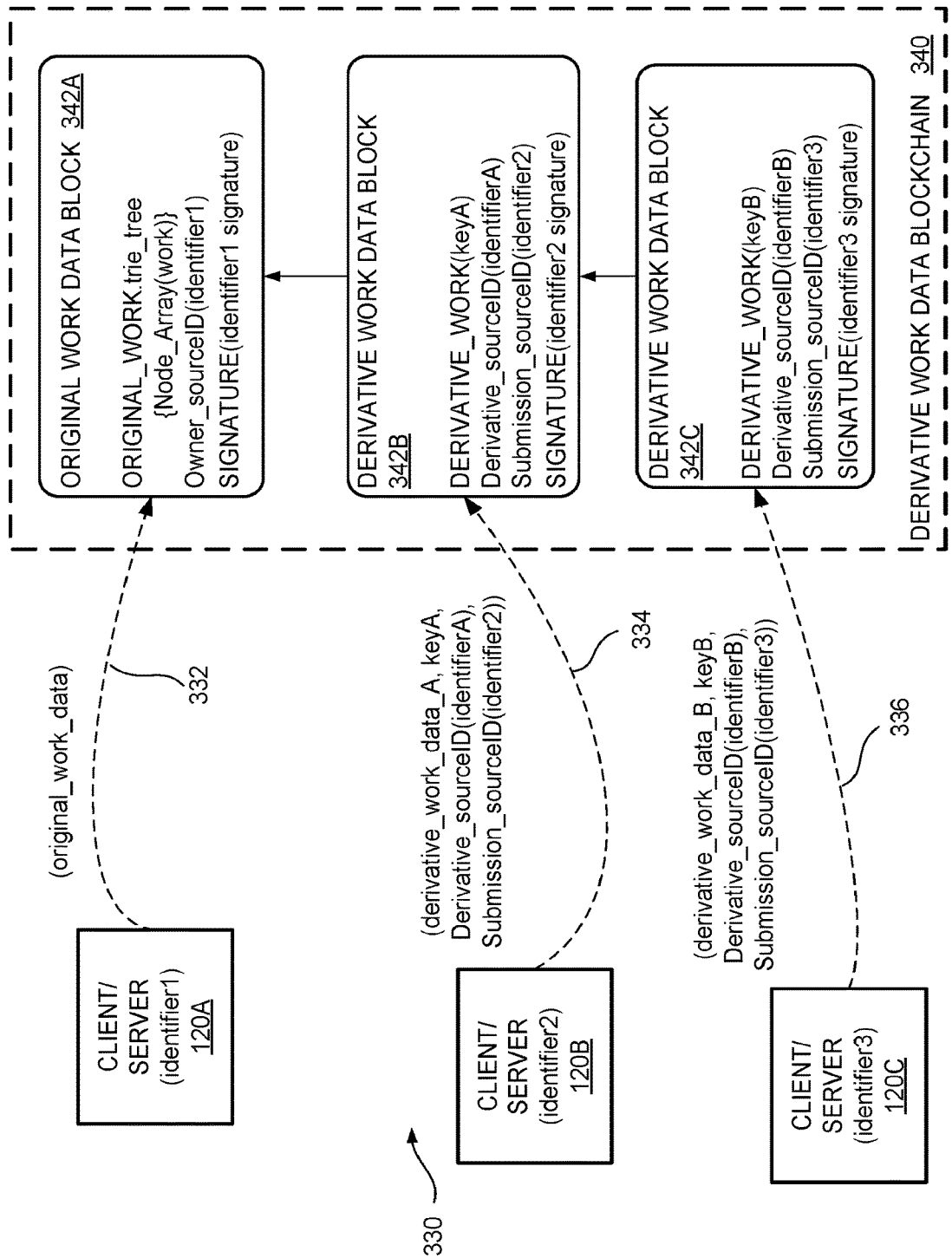
FIG. 3D is a data architecture diagram showing another illustrative example of original work data from an origination entity being submitted and stored on the blockchain example of FIG. 2C and derivative work data being submitted, validated and secured on the blockchain.

FIG. 3D is a data architecture diagram 330 showing still another illustrative example of original work data from an origination entity being submitted and stored in a modified Merkle-Patricia trie structure on the blockchain in accordance with the example of FIG. 2C and proof data in the form of a key based on derivative work data being submitted, validated and secured on the blockchain.

At 332, an origination entity, e.g. identifier1, using client/server 120A submits original_work_data that is decomposed and stored in a modified Merkle-Patricia trie structure in original work data block 342A along with an identifier for the owner of the original work data, e.g. Owner_sourceID (identifier1). In this example, the origination entity signs, e.g. SIGNATURE(identifier1 signature), the original work data block 342A to commit the block to the blockchain.

The modified Merkle-Patricia trie structure, such as the structure used in ETHERIUM, is used to map between arbitrary-length binary data, e.g. 256-bit binary fragments and arbitrary-length binary data, and provides a single value that identifies a given set of key-value pairs. A key provides a path through the trie structure to a corresponding value that is stored in a leaf node. Starting with a root node, each character of the key determines a child node to follow until a leaf node is reached. In this example, the original_work_data is decomposed into element values that are stored in leaf nodes referenced by keys.

To make a tree cryptographically secure, each node can be referenced by its hash, which can be used for look-up in a database. In this scenario, the root node becomes a cryptographic fingerprint for an entire data structure. In this example, a submitting entity searches the original_work_data for a value matching derivative_work_data and determines a key to be used to access the value in the original_work_data trie structure.

In this example, a submitting entity, e.g. identifier2, using client/server 120B searched the original_work_data for value data matching derivative_work_data_A that it discovered. At 334, the submitting entity identifier2 submits a key, keyA, for the matching value in the original_work_data trie along with the derivative_work_data_A, an identifier for a source of the derivative work, e.g. Derivative_sourceID (identifierA), and an identifier for the submitting entity, e.g. Submission_sourceID(identifier2). The proof data keyA is verified using a verification script secured by blockchain 340 and the submitted derivative_work_data_A and proof data keyA is appended to blockchain 340 in derivative work data block 342B.

Similarly, at 336, another submitting entity, e.g. identifier2, using client/server 120C submits keyB, which references a value in the original_work_data trie that matches derivative_work_data_B that was discovered by submitting entity identifier3 along with derivative_work_data_B, an identifier for a source of the derivative work, e.g. Derivative_sourceID(identifierB), and an identifier for the submitting entity, e.g. Submission_sourceID(identifier3). The proof data keyB is verified using a verification script secured by blockchain 320 and the submitted derivative_work_data_B and proof data keyB is appended to blockchain 340 in derivative work data block 342C.

FIG. 3E is a data architecture diagram showing an illustrative example of a derivative work data block 342B that includes a Verify script for verifying and appending derivative work data on the blockchain in accordance with the example of FIG. 3D. The Verify script calls a Search_trie_for_match script with the received key. The Search_trie_for_match script uses the key to traverse the trie structure and, if the key references a leaf node in the structure, return the value stored in the leaf node. If the key does not reference a valid leaf node, then the script returns a failure indication FALSE.

If the Search_trie_for_match script returns a value corresponding to the key, then the value from the original_work_data is compared to the received derivative_work_data to verify a match. If a match is found, then the received derivative_work_data, key, Derivative_sourceID, and Submission_sourceID are appended to blockchain 340 in derivative work data block.

One of ordinary skill in the art will readily appreciate that the examples above can be modified to suit various implementations without departing from the teaching of the disclosed technology.

Figure 4A:
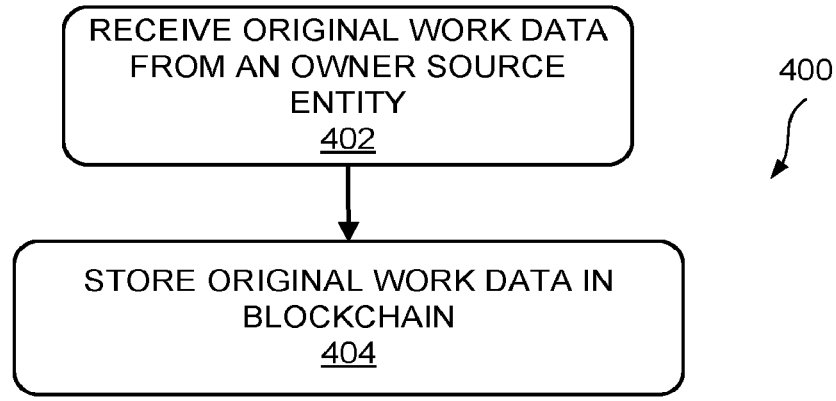
FIG. 4A is a control flow diagram showing an illustrative example of a process for receiving and storing original work data on a derivative work data blockchain.

FIG. 4A is a control flow diagram showing an illustrative example of a process 400 for receiving and storing original work data on a derivative work data blockchain. At 402, original work data is received from an owner source entity for an original work. At 404, the original work data is stored in a derivative work data blockchain. As discussed above, the original work data can be decomposed into sub-elements and stored as an array or in a modified Merkle-Patricia trie, though many other approaches to storing the original work data, such as in a data file, flat file, or linked list, can also be utilized without departing from the scope of the disclosed technology.

Figure 4B:
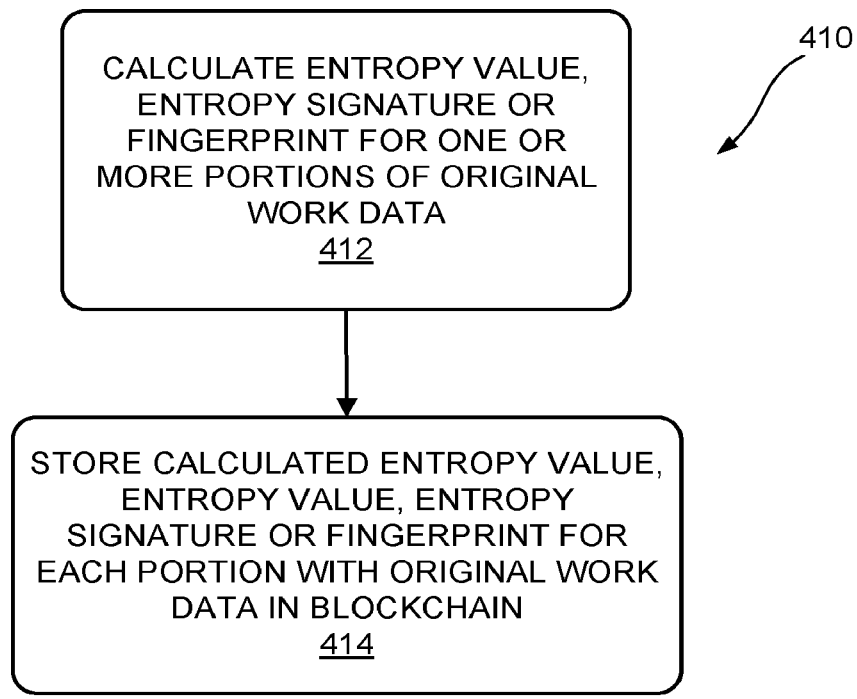
FIG. 4B is a control flow diagram showing an illustrative example relating to the derivative work data blockchain of FIG. 2B of a process for calculating metadata for the original work data and securing the metadata on the derivative work data blockchain.

FIG. 4B is a control flow diagram showing an illustrative example relating to the derivative work data blockchain of FIG. 2B of a process 410 for calculating metadata for the original work data and securing the metadata on a derivative work data blockchain. At 412, metadata for the original work data, such as an entropy value, entropy signature, fingerprint or other form that reflects an identifying characteristic of the data, is generated for one or more portions of the original work data. For example, the original work data can be decomposed into multiple elements and an entropy value calculated for each element.

In this example, at 414, the metadata generated at 412 is stored with the original work data. For example, an entropy signature for each element of the original work data can be stored with the element. Or, in another example, an entropy value or signature can be used as an index to map the entropy value or signature to the element. A variety of approaches can be utilized without departing from the disclosed technology.

Figure 4C:
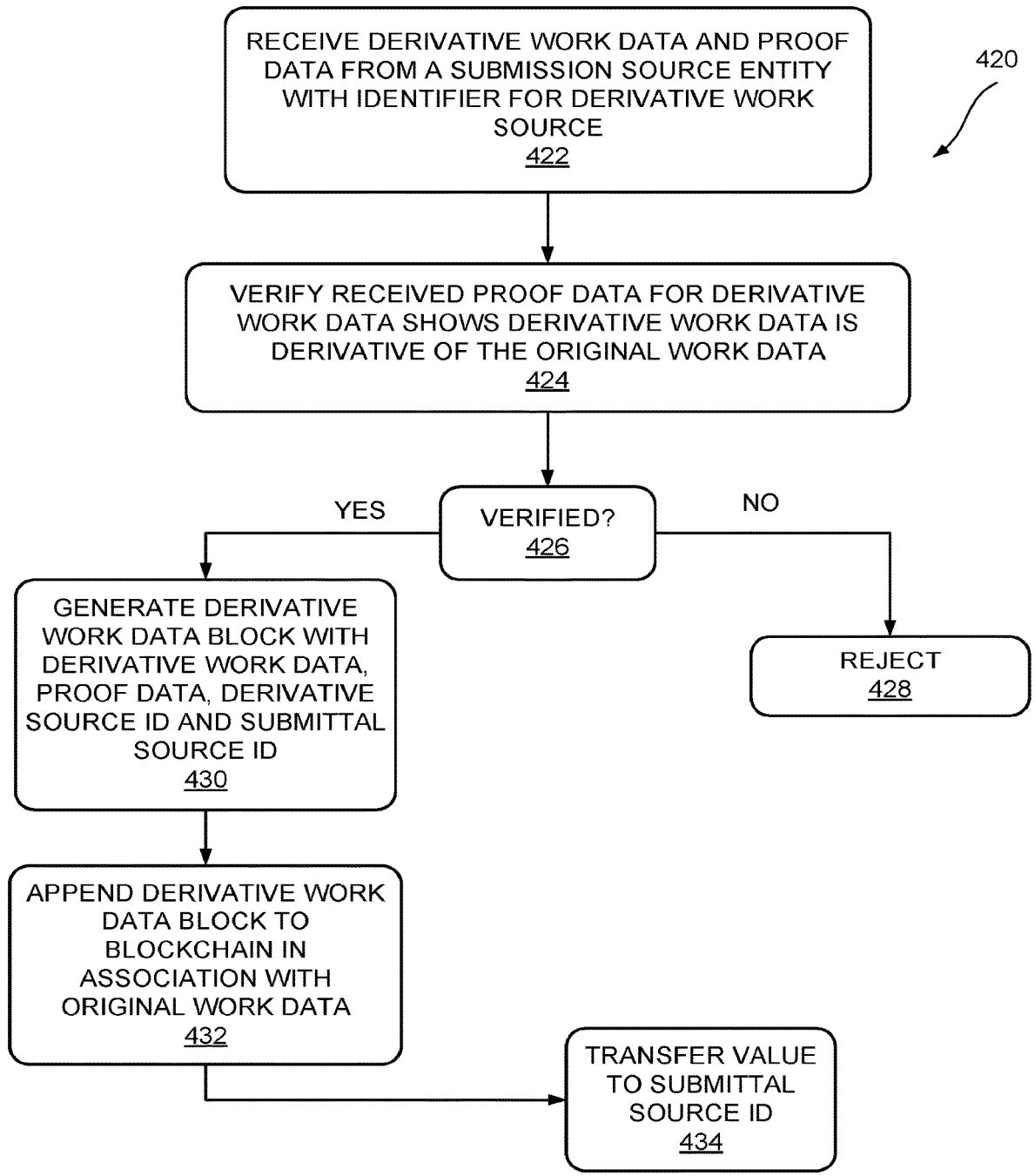
FIG. 4C is a control flow diagram illustrating an example of a verification process for proof data submitted to a derivative work data blockchain.

FIG. 4C is a control flow diagram illustrating an example of a verification process 420 for proof data submitted to a derivative work data blockchain. At 422, derivative work data and proof data are received from a submission source entity along with an identifier for a source of the derivative work.

At 424, the proof data received is checked to verify that the derivative work data is derivative of the original work data. As discussed above, there are many approaches to verification that are consistent with the disclosed technology. For example, an entropy value or signature for the derivative work data can be compared to an entropy value or signature for the original work data or an element of the original work data. In another example, the received derivative work data is used to search the original work data for a match. In yet another example, a key is used to reference a value in an original work data trie and the value from the trie compared to the received derivative work data.

If the proof data fails verification, then control branches at 426 to 428, where the submittal of derivative work data is rejected. If the proof data passes verification, then control branches at 426 to 430, where a derivative work data block is generated that includes the received derivative work data, proof data, derivative work source identifier and submitter source identifier and, at 432, the derivative work data block is appended to the blockchain in association with the original work data.

In some implementations, control continues to 434, where value is transferred to the submitting entity identified by the submittal source identifier. The value transferred can take a variety of forms, such as crypto-currency, access to computer resources, or credits and discounts usable for purchases, as well as reputational value, such as being identified as a high submitter. The provision of a value transfer feature can motivate entities to search and identify derivative works, such as a crowd-sourced search for derivative works.

Figure 4D:
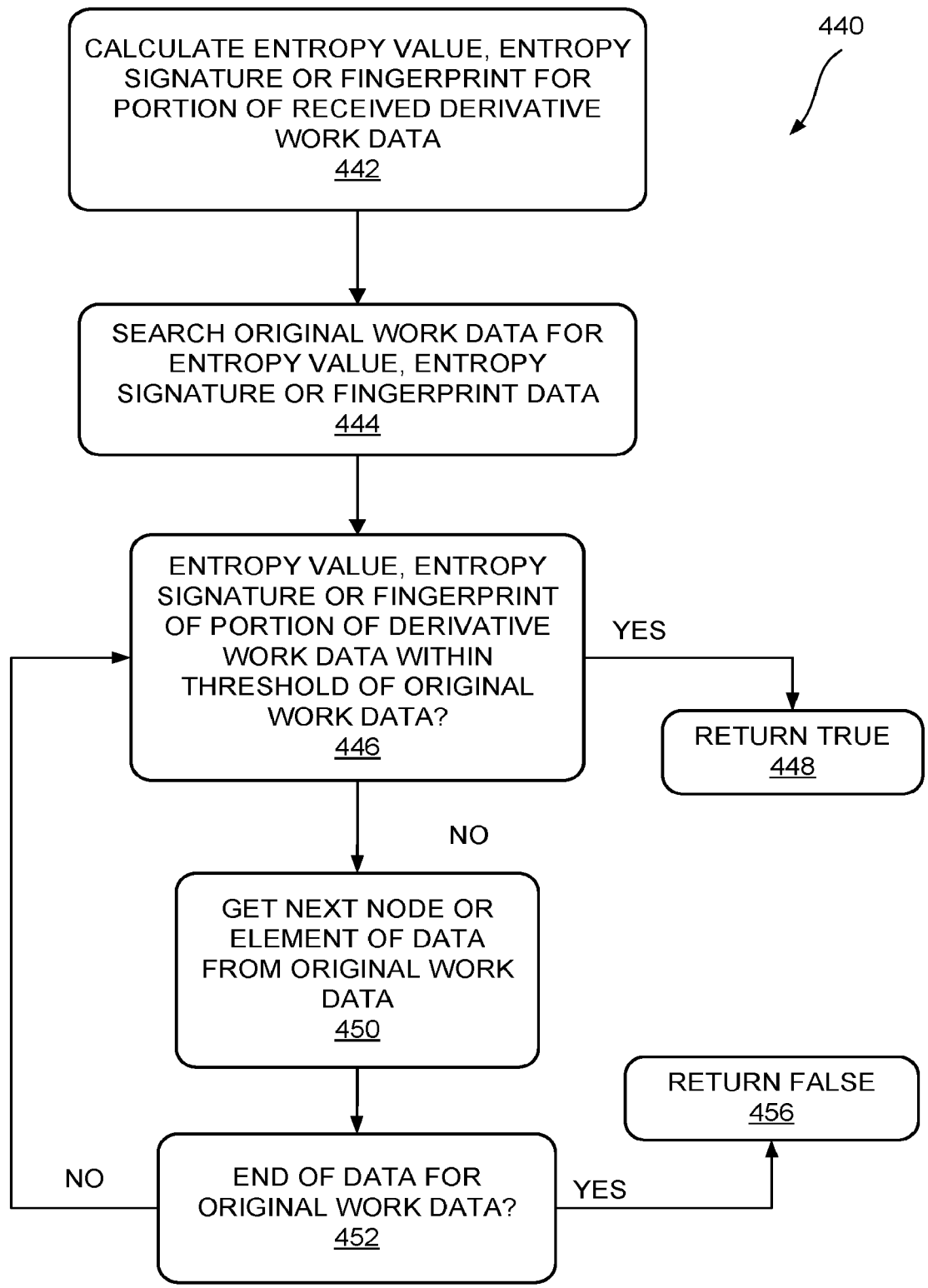
FIG. 4D is a control flow diagram illustrating an example of a search process relating to the derivative work data blockchain of FIG. 2B for proof data submitted to a derivative work data blockchain.

FIG. 4D is a control flow diagram illustrating an example of a search process 440 relating to the derivative work data blockchain of FIG. 2B for proof data submitted to a derivative work data blockchain. In this example, at 442, characteristic metadata, such as an entropy value or signature or a fingerprint are generated for at least a portion of derivate work data received from a submitting entity. In some implementations, the received derivative work data can be broken up into multiple smaller portions that are searched separately.

At 444, the metadata calculated for the received derivative work data is used to search the original work data. For example, a tree or index is searched for an element of the original work data having the same or similar metadata. In one scenario, entropy signatures calculated for elements of the original work data are searched for a match on the entropy signature for the derivative work data. In another scenario, entropy values calculated for elements of the original work data are searched for a match for the entropy value calculated for the derivative work data. In yet another scenario, a fingerprint from the derivative work data using a hash function is used to search a trie structure for the original work data.

At 446, in this example, if the characteristic metadata, e.g. entropy value, signature or fingerprint, for all or a portion of the derivative work data is within a threshold range of characteristic metadata for all or a portion of the original work data, then control branches to 448 to return a TRUE value. For example, if a difference between an entropy value calculated for the derivative work data and an entropy level for an element of the original work data is less than a predetermined threshold value, then the derivative work data is verified as derivative of the original work data.

If the characteristic metadata is not within the threshold range of characteristic metadata for the original work data, then, in this example, control branches to 450 to get a next portion, such as a node of a tree of element of an array, of the original work data for comparison to the characteristic metadata for the derivative work data at 446. For example, a characteristic metadata value calculated for all or a portion of the derivative work data is compared to the characteristic metadata value for each element in an original work data array or tree. This process may be repeated for additional portions of the derivative work data. If the end of the original work data is reached without finding a match, then control branches at 452 to 456 to return a FALSE value.

Figure 4E:
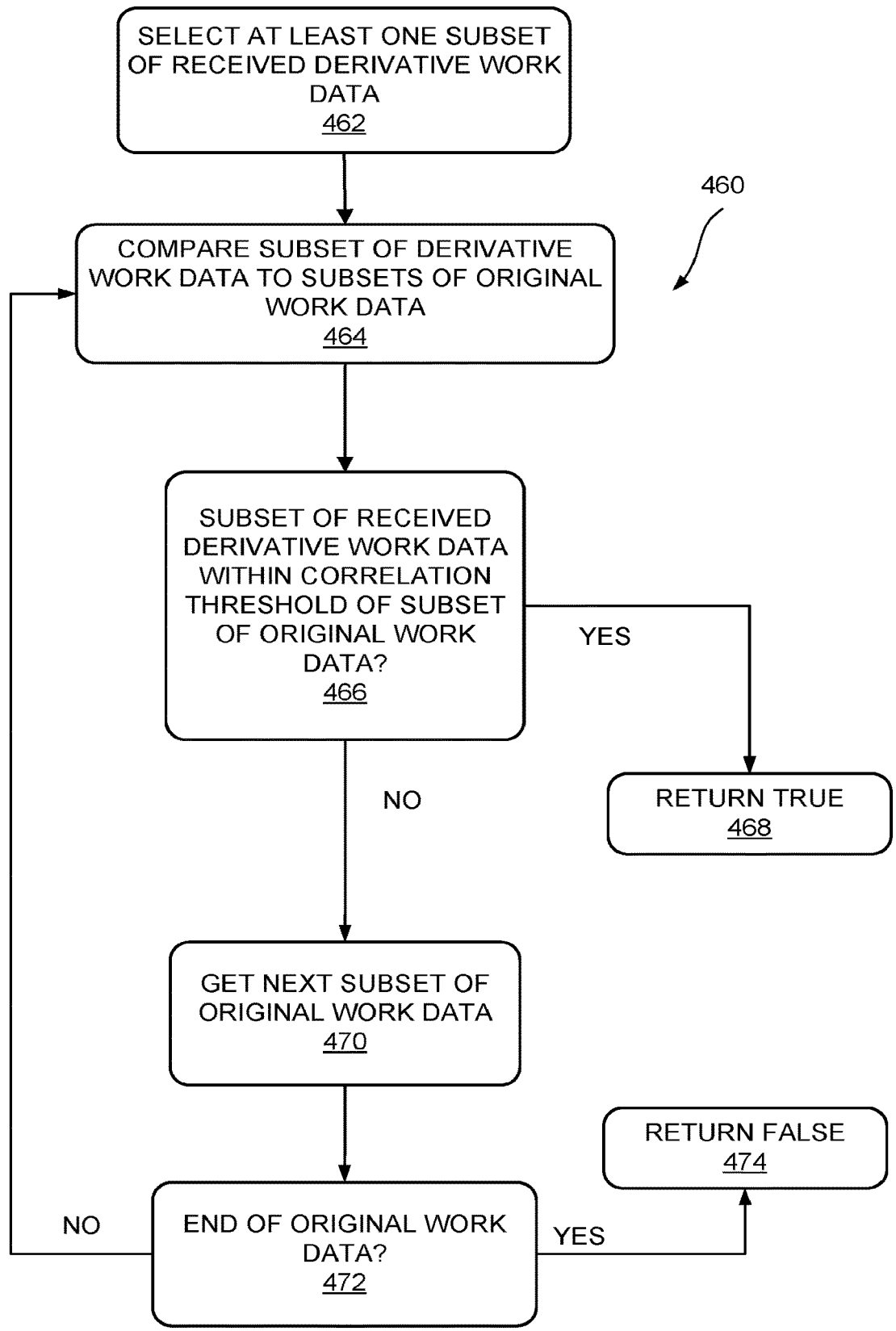
FIG. 4E is a control flow diagram illustrating an example of a search process relating to the derivative work data blockchain of FIG. 2C for proof data submitted to a derivative work data blockchain.

FIG. 4E is a control flow diagram illustrating an example of a search process 460 relating to the derivative work data blockchain of FIG. 2C, where a subset of the derivative work data is used to search for a matching subset of the original work data. For example, a sliding window buffer containing the subset of derivative work data selected at 462 is compared to subsets of original work data at 464.

At 466, if the correlation between the subset of derivative work data and a subset of the original work data meets a predetermined correlation threshold, then control branches to 468 to return TRUE indicating that the derivative work data is verified as derivative of the original work data. If the correlation threshold is not met, then control branches to 470 to get the next subset of original work data for comparison to the subset of derivative work data at 464. If the end of the original work data is encountered at 472, then control branches to 474 to return FALSE indicating that the derivative work data failed verification. The process can be repeated for multiple subsets of the derivative work data.

In one example scenario, a 256 byte subset of the derivative work data is sequentially compared on a bytewise basis to the original work data to identify a correlation between the derivative work data and the original work data. If a match is found on the 256 byte subset, then the size of the derivative work data subset is increased to 512 bytes and compared to adjacent data in the original work data. The size of the derivative work data subset is increased until no match is found. If the size of the derivative work data subset is greater than a 1024 byte correlation threshold, then the derivative work data is verified.

Figure 4F:
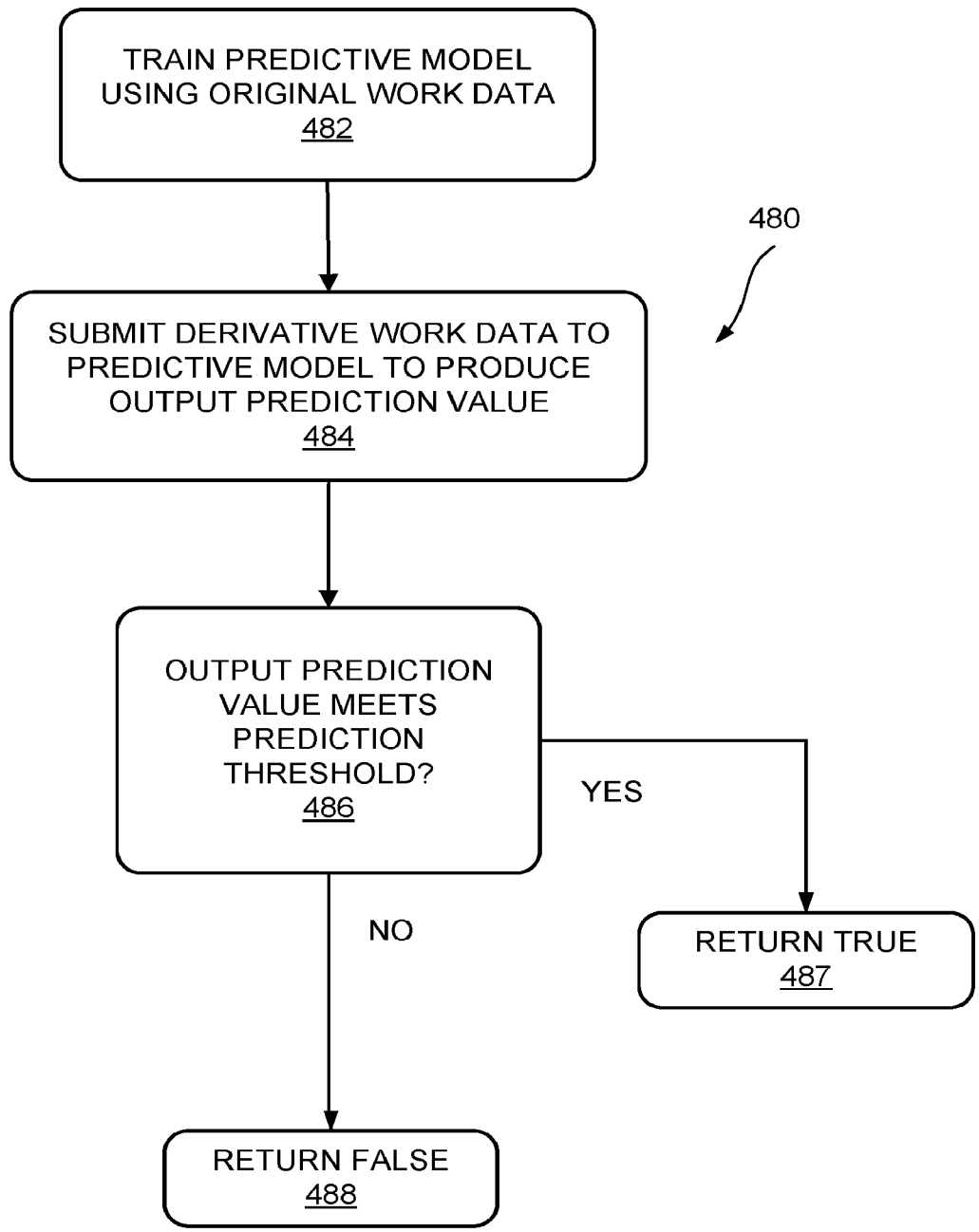
FIG. 4F is a control flow diagram illustrating an example of a verification process based on predictive modeling for proof data submitted to a derivative work data blockchain.

FIG. 4F is a control flow diagram illustrating an example of a verification process 480 based on predictive modeling for proof data submitted to a derivative work data blockchain. In this example, at 482, a predictive model is trained on differentiation of the original work data from derivative work data. The prediction model can utilize one model approach or multiple approaches, such as a linear regression model, a logistic regression model, a decision tree, a support vector machine, a naïve Bayesian machine, k-means clustering, a gradient booting algorithm, a convolution neural network, a recurrent neural network, or a multi-instance learning algorithm.

At 484, derivative work data is submitted to the predictive model to produce an output prediction value indicating a likelihood that the derivative work data is derivative of the original work data. At 486, if the output prediction value meets a predetermined threshold, then control branches to 487 to return TRUE indicating that the derivative work data is verified as derivative of the original work data. Otherwise, control branches to 488 to return FALSE indicating that the derivative work data failed verification.

Figure 4G:
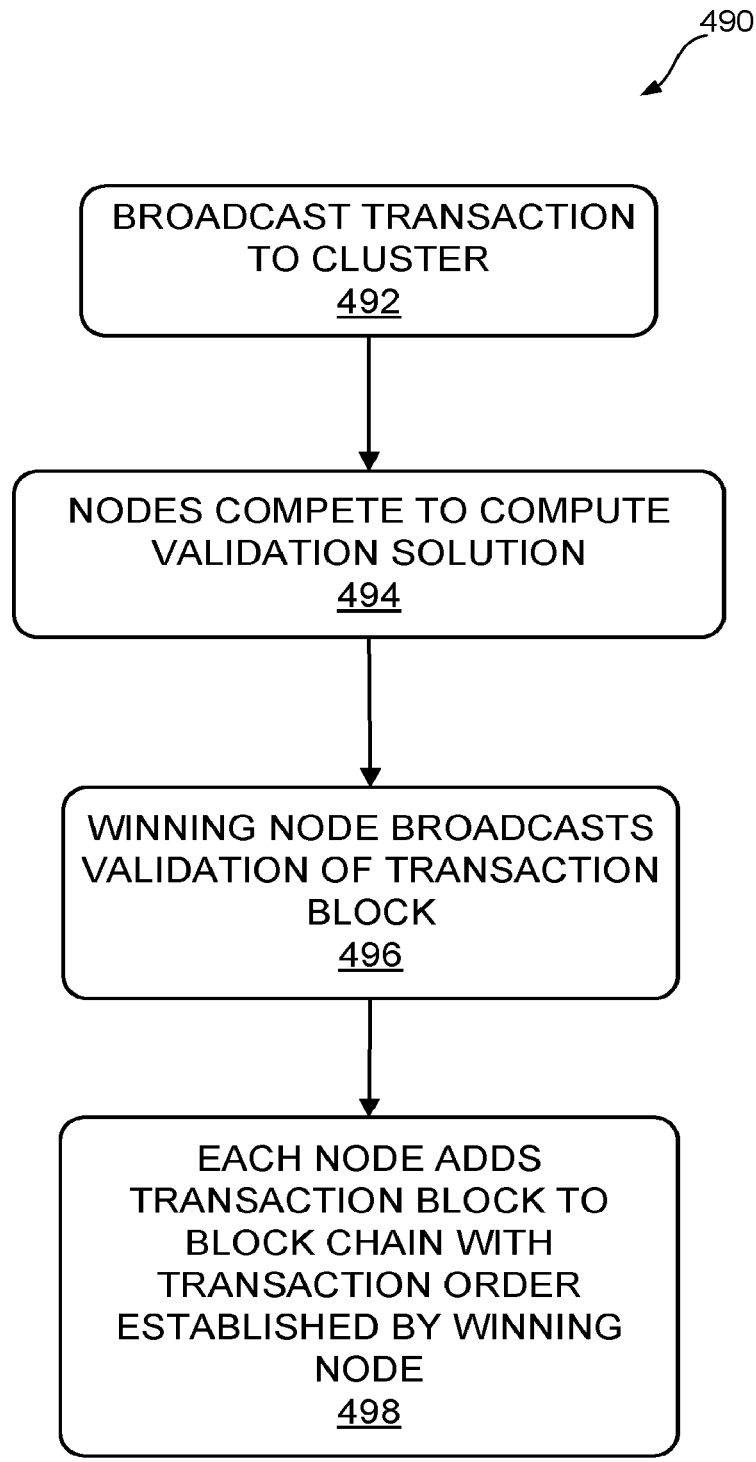
FIG. 4G is a control flow diagram illustrating an example of a verification process for derivative work data blocks added to a derivative work data blockchain ledger that is distributed to untrusted nodes.

FIG. 4G is a control flow diagram illustrating an example of a validation process 490 for derivative work data blocks added to a derivative work data blockchain ledger that is distributed to untrusted nodes.

In process 490, when a derivative work data block, such as the derivative work data blocks 142B-E, is created and appended to a derivative work data blockchain 140 of FIG. 1, the append transaction is broadcast, at 492, to the cluster of untrusted nodes. At 494, nodes compete to compute a validation solution for the append transaction. At 496, a winning node broadcasts the validation solution for the derivative work data block and adds the derivative work data block to its copy of the derivative work data blockchain ledger. At 498, in response to the winning node's broadcast, the other nodes add the derivative work data block to their copies of the derivative work data blockchain ledger in the transaction order established by the winning node. The decentralized validation protocol can maintain the integrity and security of the derivative work data blockchain ledger.

Access to the content of the derivative work data blockchain may be handled in a variety of ways. For maximum transparency and access, the derivative work data blockchain can be initiated on a public blockchain with the data being available to any person who can access the blockchain. Or the derivative work data blockchain may be configured to encrypt the original work data or derivative work data to restrict access so that the data is tightly controlled. For example, only selected submitting entities identified can be provided with access to the derivative work data blockchain.

Depending upon the scripting capabilities of the blockchain platform, the data blocks of the derivative work data blockchain may include more extensive code execution. It should be appreciated that the utilization of blockchain technology, such as scripting technology within smart contracts, in this context provides a high degree of flexibility and variation in the configuration of implementations without departing from the teachings of the present disclosure.

Figure 5:
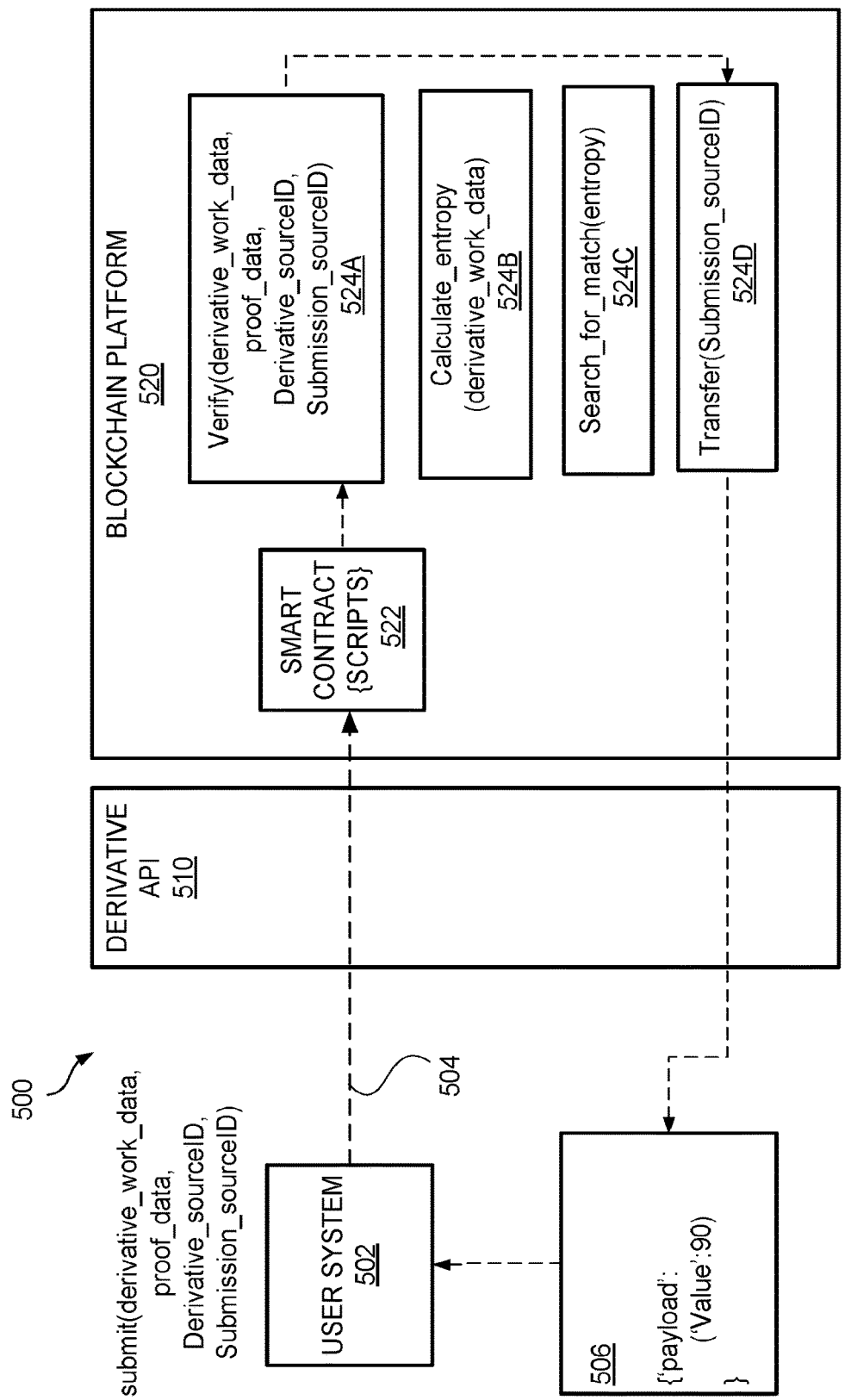
FIG. 5 is a data architecture diagram showing an illustrative example of a user submission source submitting derivative work data and information to a derivative work data blockchain using an application programming interface.

FIG. 5 is a data architecture diagram 500 showing an illustrative example of a user submitting derivative work data to a derivative work data blockchain, such as derivative work data blockchain 320 of FIG. 3A, supported by blockchain platform 520. In this example, a submittal Application Program Interface (API) 510 provides an interface to the blockchain platform 520 that supports the derivative work data blockchain. The blockchain platform 520 supports smart contract 522, which includes scripts 524 with code that, when executed by the blockchain platform 520, performs operations with respect to the derivative work data blockchain.

In the example of FIG. 5, three scripts are defined in smart contract 522, which reflects derivative work data block 322B of FIG. 3B. The Verify script 524A verifies that derivative work data submitted by the user is derivative of original work data stored in the derivative work data blockchain. The Calculate_entropy script 524B calculates an entropy value for derivative work data submitted by with a user submittal. The Search_for_match script 524C searches original work data for an entry with a similar entropy value. The Transfer script 524D transfers value to a user who has submitted verified derivative work data. The scripts 524 shown are merely examples and many other different or additional scripts can be defined using the capability of the executable scripts in smart contract 522 as provided for on blockchain platform 520.

FIG. 5 shows a user system 502 submitting derivative work data through API 510 in message 504, e.g. submit (derivative_work_data, proof_data, Derivative_sourceID, Submission_sourceID). API 510 invokes smart contract 522 causing blockchain platform 520 to execute the Verify script 524A to verify the derivative work data submitted in message 504. The Verify script 524A invokes the Calculate_entropy script 524B to obtain an entropy value and invokes the Search_for_match script 524C with the entropy value to search for an element of original work data with a matching entropy value. If a match is found, the Verify scripts 524A invokes Transfer script 524D to transfer value to using user system 502, e.g. Submission_sourceID, at 506.

Blockchain Ledger Data Structures

Figure 6A:
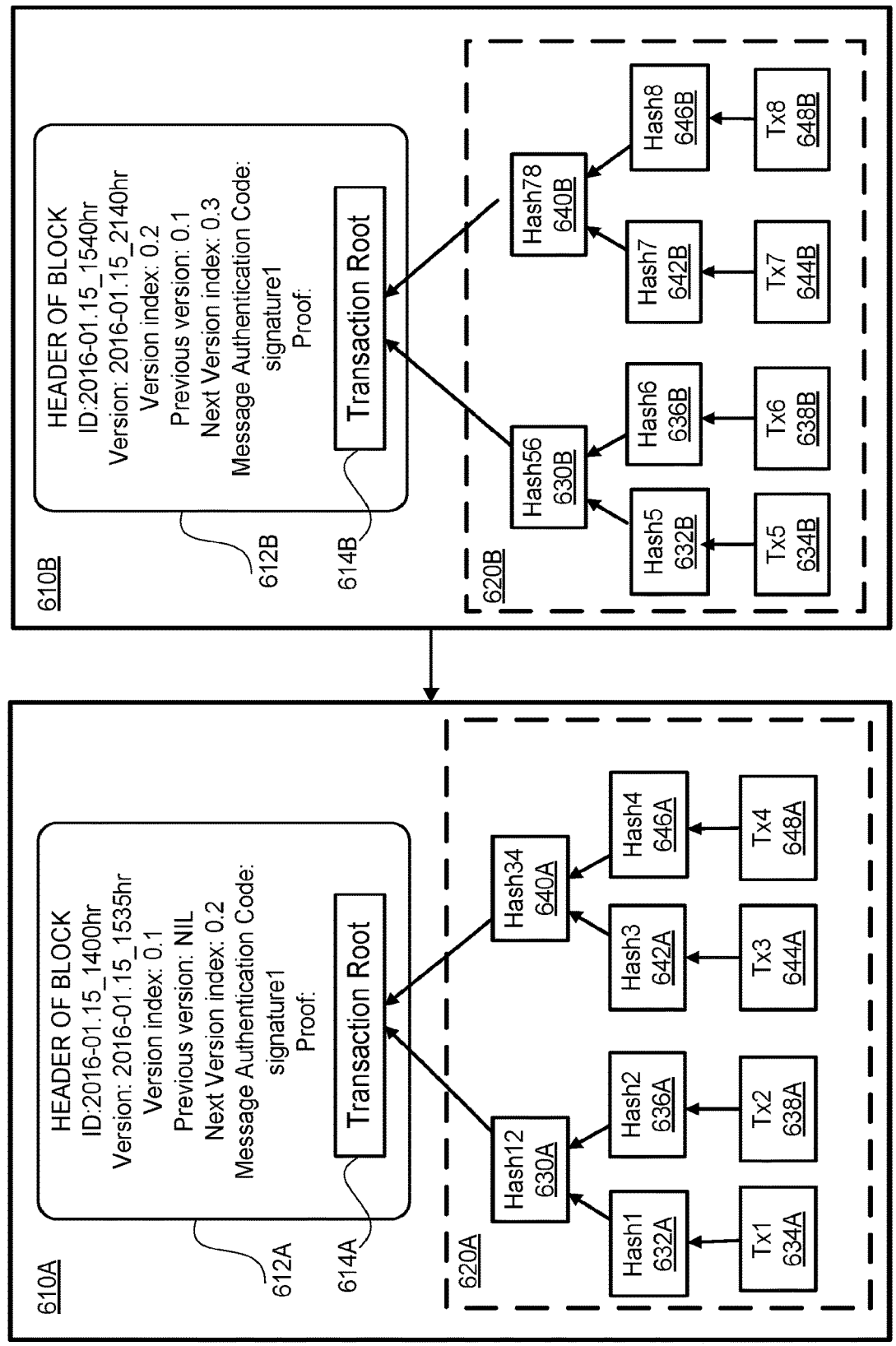
FIG. 6A is a data architecture diagram illustrating a simplified example of a blockchain ledger based on the blocks of the derivative work data blockchain of FIG. 1.

FIG. 6A is a data architecture diagram illustrating a simplified example of a blockchain ledger 600 based on the blocks 142A-E of the derivative work data blockchain 140 of FIG. 1. The blockchain ledger 600 example of FIG. 6A is simplified to show block headers, metadata and signatures similar to blocks 210A-E in FIG. 2A in order to demonstrate a derivative work data blockchain. In outline, a blockchain ledger may be a globally shared transactional database.

FIG. 6A is an illustrative example of a blockchain ledger 600 with a data tree holding transaction data that is verified using cryptographic techniques. In FIG. 6A, each block 610 includes a block header 612 with information regarding previous and subsequent blocks and stores a transaction root node 614 to a data tree 620 holding transactional data. Transaction data may store smart contracts, data related to transactions, or any other data. The elements of smart contracts may also be stored within transaction nodes of the blocks.

In the example of FIG. 6A, a Merkle tree 620 is used to cryptographically secure the transaction data. For example, Transaction Tx1 node 634A of data tree 620A of block 610A can be hashed to Hash1 node 632A, Transaction Tx2 node 638A may be hashed to Hash2 node 636A. Hash1 node 632A and Hash2 node 636A may be hashed to Hash12 node 630A. A similar subtree may be formed to generate Hash34 node 640A. Hash12 node 630A and Hash34 node 640A may be hashed to Transaction Root 614A hash sorted in the data block 610A. By using a Merkle tree, or any similar data structure, the integrity of the transactions may be checked by verifying the hash is correct.

Figure 6B:
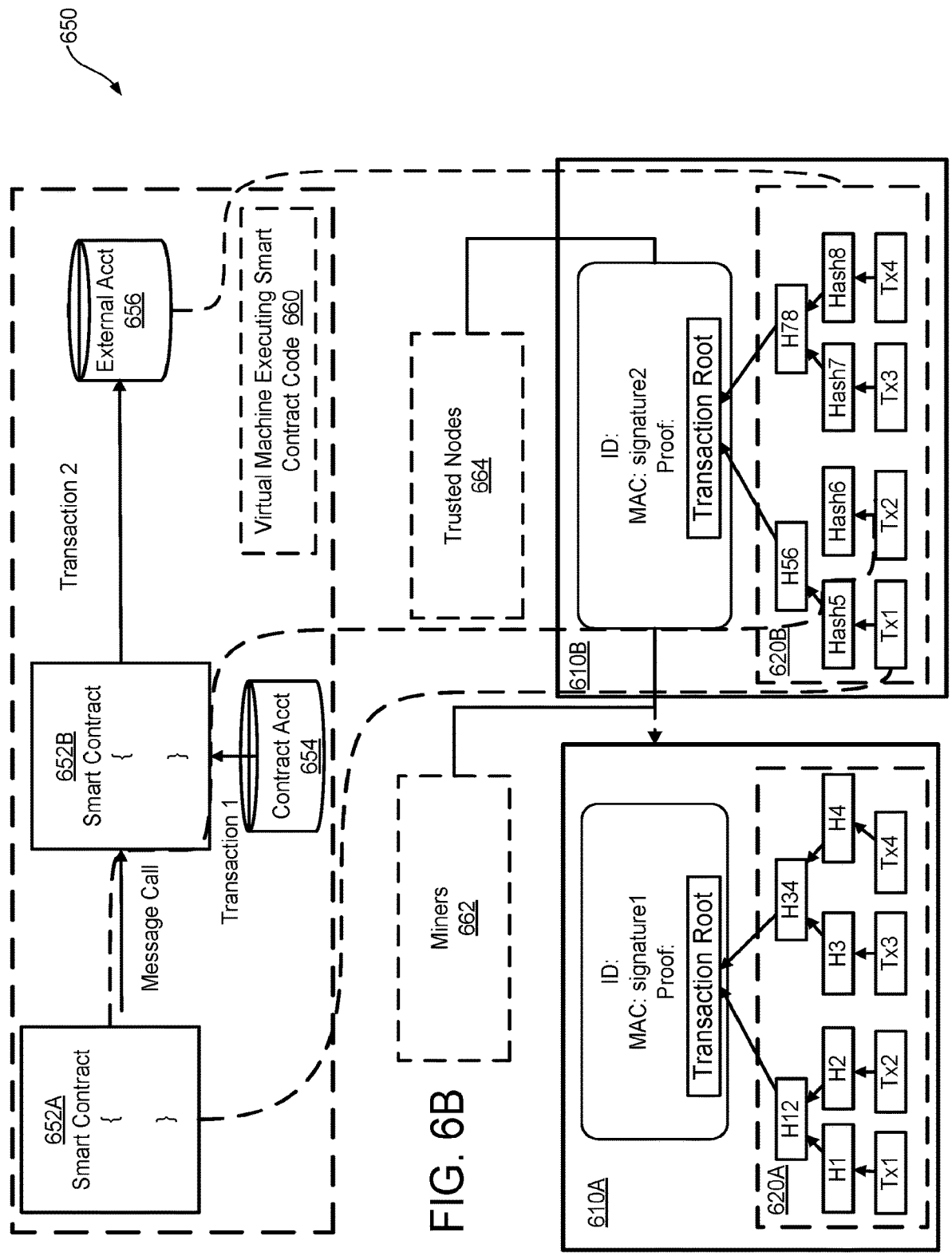
FIG. 6B is a data architecture diagram showing an illustrative example of smart contract code, transactions and messages that are bundled into a block so that their integrity is cryptographically secure and so that they may be appended to a blockchain ledger.

FIG. 6B is a data architecture diagram showing an illustrative example of smart contract code, transactions and messages that are bundled into a block so that their integrity is cryptographically secure and so that they may be appended to a blockchain ledger. In FIG. 6B, smart contracts 652 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 6B, smart contracts 652 are executed in a virtual machine environment, although this is optional.

In FIG. 6B, the aspects of smart contracts 652 are stored in transaction data nodes in data tree 620 in the blocks 610 of the blockchain ledger of FIG. 6A. In the example of FIG. 6B, Smart Contract 652A is stored in data block Tx1 node 634A of data tree 620A in block 610A, Smart Contract 652B is stored in Tx2 node 638A, Contract Account 654 associated with Smart Contract 652B is stored in Tx3 node 644A, and External Account is stored in Tx4 node 648A.

Figure 6C:
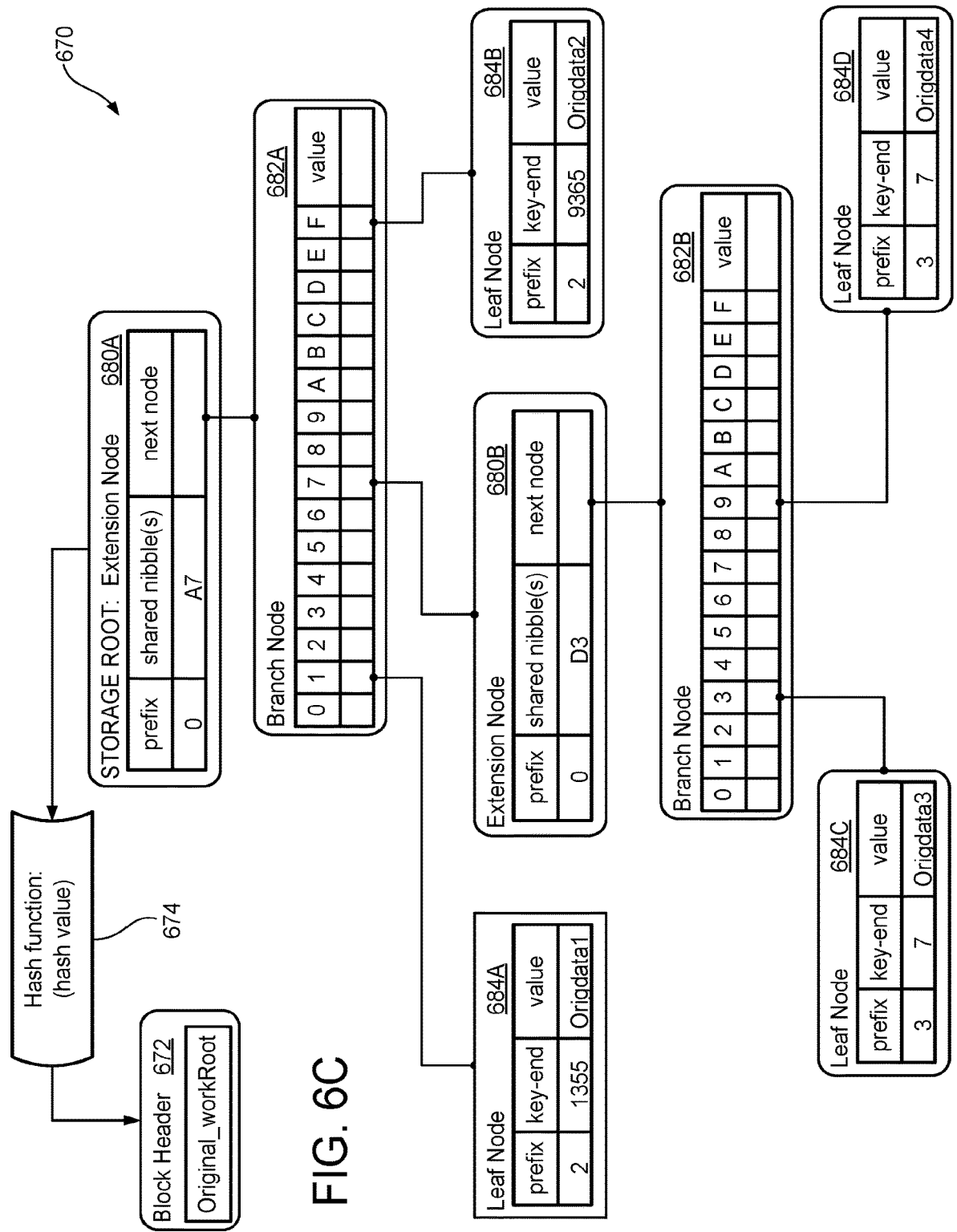
FIG. 6C is a data architecture diagram showing an illustrative example of a modified Merkle-Patricia trie structure for storing data in a blockchain ledger.

FIG. 6C is a data architecture diagram showing an illustrative example of a modified Merkle-Patricia trie structure 670 for storing data in a blockchain ledger as used in ETHERIUM. A trie is an ordered data structure that can be used to store a dynamic set or associative array with keys that provide unique key-value pairs. The position of a node in the trie structure defines the key to which it is associated and a value stored in the node defines the value of the key-value pair for the node. In the present disclosure, a modified Merkle-Patricia trie structure can be used to store original work data.

As noted above, a modified Merkle-Patricia trie structure can be used to map between arbitrary-length binary data, e.g. 256-bit binary fragments and arbitrary-length binary data, and provides a single value that identifies a given set of key-value pairs. A key provides a path through the trie structure to a corresponding value that is stored in a leaf node 684. Starting with a root node 680A, each character of the key determines a child node to follow until a leaf node 684 is reached.

In the example of FIG. 6C, trie 670 is structured to map alphanumeric keys to values stored in the trie. Three different node types are defined: extension, branch and leaf. Root node 680A for the trie 670 is an extension node that represents a shared nibble of A7 in the key string and has a next node link to branch node 682A.

Branch node 682A, in turn, includes a branch array with three links representing continuing paths. The 1 position in the branch array contains a link to leaf node 684A, which is a terminal node in the trie. Leaf node 684A contains a key-end value of 1355 and stores a value Origdata1. Thus, an alphanumeric key of A711355 maps to the value Origdata1. Similarly, the F position in the branch array contains a link to leaf node 684B, which is another terminal node in the trie. Leaf node 684B contains a key-end value of 9365 and stores a value Origdata2. Thus, an alphanumeric key of A7F9365 maps to the value Origdata2.

The 7 position in the branch array of branch node 682A contains a link to extension node 680B, which represents a shared nibble value D3 in the key string. Thus, the combination of root node 680A, branch node 682A, and extension node 680B encodes A77D3 in the key string.

The next node of extension node 680B links to branch node 682B with a branch array with two links for continuing paths in the trie. The 3 position in the branch array links to leaf node 684C, which has a key-end of 7 and stores value Origdata3. Thus, alphanumeric key A77D337 maps to the Origdata3 value. The 9 position in the branch array of branch node 682B links to leaf node 684D, which also has a key-end of 7 and stores value Origdata4. Thus, alphanumeric key A77D397 maps to the Origdata4 value. Note that the trie example 670 can be extended with additional extension nodes to map keys of arbitrary length to values of arbitrary size.

To make a tree cryptographically secure, each node can be referenced by its hash, which can be used for look-up in a database. In this scenario, the root node becomes a cryptographic fingerprint for an entire data structure. In this example, a submitting entity searches the original_work_data for a value matching derivative_work_data and determines a key to be used to access the value in the original_work_data trie structure.

Additional background information regarding the modified Merkle-Patricia trie system used in the ETHERIUM blockchain can be found at https://etherium.stackexchange.com, herein incorporated by reference for all purposes.

Storage of Smart Contracts and Transaction Data in the Blockchain Ledger

To ensure the smart contracts are secure and generate secure data, the blockchain ledger must be kept up to date. For example, if a smart contract is created, the code associated with a smart contract must be stored in a secure way. Similarly, when smart contract code executes and generates transaction data, the transaction data must be stored in a secure way.

In the example of FIG. 6B, two possible embodiments for maintenance of the blockchain ledger are shown. In one embodiment, untrusted miner nodes ("miners") 680 may be rewarded for solving a cryptographic puzzle and thereby be allowed to append a block to the blockchain. Alternatively, a set of trusted nodes 690 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process is determined by a centralized control of a cluster of trusted nodes. In this case, the centralized control may be a trusted node, such as client/server 120A, authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. a derivative work data block 142 for derivative work data blockchain 140, the block is an unconfirmed and unidentified entity. To be part of the acknowledged "currency", it may be added to the blockchain, and therefore relates to the concept of a trusted cluster.

In a trusted cluster, when a derivative work data block 142 is added, every node competes to acknowledge the next "transaction" (e.g. appending derivative work data). In one example, the nodes compete to mine and get the lowest hash value: min{previous_hash, contents_hash, random_nonce_to_be_guessed}→result. Transaction order is protected by the computational race (faith that no one entity can beat the collective resources of the blockchain network). Mutual authentication parameters are broadcast and acknowledged to prevent double entries in the blockchain.

Alternatively, by broadcasting the meta-data for authenticating a secure ledger across a restricted network, e.g. only the signed hash is broadcast, the blockchain may reduce the risks that come with data being held centrally. Decentralized consensus makes blockchains suitable for the recording of secure transactions or events. The meta-data, which may contain information related to derivative work data, may also be ciphered for restricted access so that the meta-data does not disclose information pertaining to the derivative work data.

The mining process, such as may be used in concert with the validation process 490 of FIG. 4G, may be utilized to deter double accounting, overriding or replaying attacks, with the community arrangement on the agreement based on the "good faith" that no single node can control the entire cluster. The working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions are broadcast to the network using software. Mining nodes validate transactions, add them to the block they are building, and then broadcast the completed block to other nodes.

Note that in a restricted network, stake-holders who are authorized to check or mine for the derivative work data may or may not access the transaction blocks themselves, but would need to have keys to the meta-data (since they are members of the restricted network, and are trusted) to get the details. As keys are applied on data with different data classifications, the stake-holders can be segmented.

A decentralized blockchain may also use ad-hoc secure message passing and distributed networking. In this example, the derivative work data blockchain ledger may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the trusted source list as centrally authorized and kept offline.

In some examples, access to a distributed derivative work data blockchain may be restricted by cryptographic means to be only open to authorized servers. Since one or both of the blockchain ledgers are distributed, the authorized servers can validate it. A public key may be used as an address on a public blockchain ledger.

Note that growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving a derivative work data blockchain ledger. The specific examples of different aspects of a derivative work data blockchain ledger described herein are illustrative and are not intended to limit the scope of the techniques shown.

Smart Contracts

Smart contracts are defined by code. As described previously, the terms and conditions of the smart contract may be encoded (e.g., by hash) into a block-chain ledger. Specifically, smart contracts may be compiled into a bytecode (if executed in a virtual machine), and then the bytecode may be stored in a block-chain ledger as described previously. Similarly, transaction data executed and generated by smart contracts may be stored in the block-chain ledger in the ways previously described.

Computer Architectures for Use of Smart Contracts and Blockchain Ledgers

Figure 8:
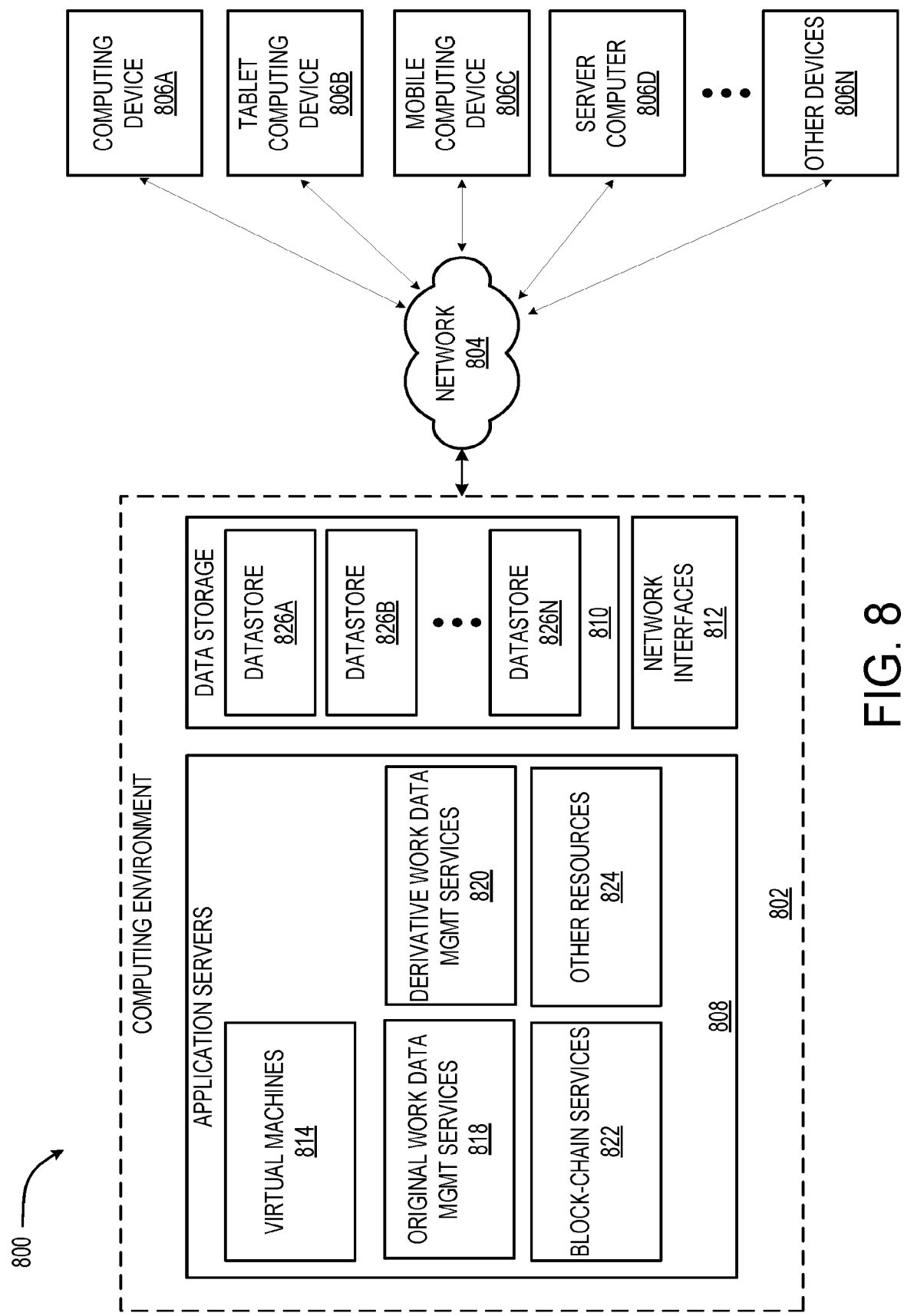
FIG. 8 is a diagram illustrating a distributed computing environment capable of implementing aspects of the techniques and technologies presented herein.

Note that at least parts of processes 400, 410, 420, 440, 460, 480 and 490 of FIGS. 4A-G, the scripts of derivative work data block 322B of FIGS. 3B and 3C and block 342B of FIG. 3E, smart contract 522 of FIG. 5, smart contracts 652 of FIG. 6B, and other processes and operations pertaining to derivative work data blockchain ledgers described herein may be implemented in one or more servers, such as computer environment 800 in FIG. 8, or the cloud, and data defining the results of user control input signals translated or interpreted as discussed herein may be communicated to a user device for display. Alternatively, the derivative work data blockchain ledger processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 400, 410, 420, 440, 460, 480 and 490 of FIGS. 4A-G, the scripts of derivative work data block 322B of FIGS. 3B and 3C and block 342B of FIG. 3E, smart contract 522 of FIG. 5, smart contracts 652 of FIG. 6B) are described herein as being implemented, at least in part, by an application, component, and/or circuit. Although the following illustration refers to the components of FIGS. 3B, 3C, 3E, 4A-G, 5 and 6B, 1, 5, 6 and 7, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 410, 420, 440, 460, 480 and 490 of FIGS. 4A-G, the scripts of derivative work data block 322B of FIGS. 3B and 3C and block 342B of FIG. 3E, smart contract 522 of FIG. 5, smart contracts 652 of FIG. 6B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 7:
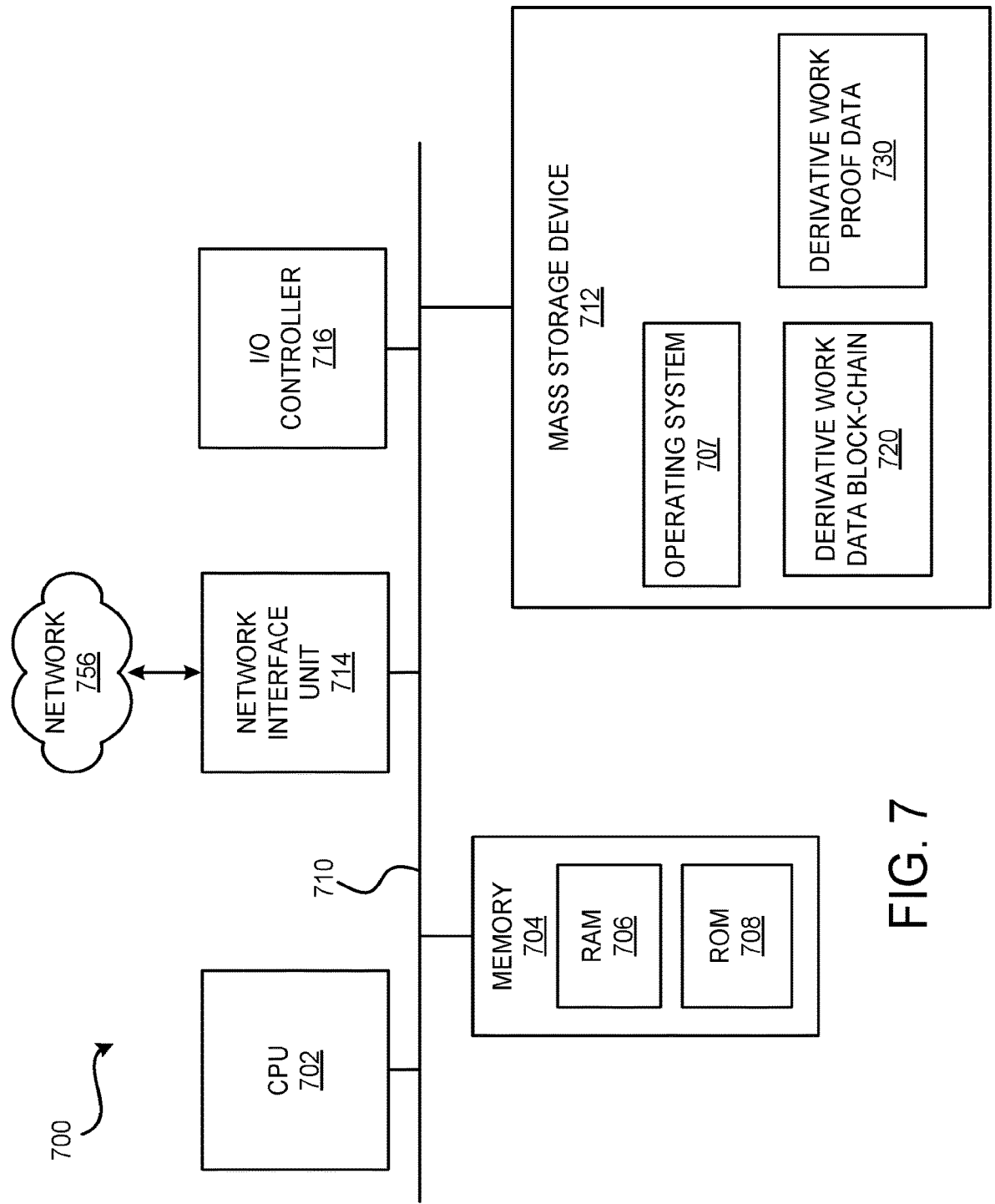
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as the client/servers 120A-D (FIG. 1), capable of executing the program components described herein. Thus, the computer architecture 700 illustrated in FIG. 7 illustrates an architecture for a server computer, mobile phone, a PDA, a smart phone, a desktop computer, a netbook computer, a tablet computer, an on-board computer, a game console, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between sub-elements within the computer architecture 700, such as during startup, is stored in the ROM 708. The computer architecture 700 further includes a mass storage device 712 for storing an operating system 707, data (such as a copy of derivative work data blockchain data 720 or derivative work data 730), and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, game controller, television remote or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

FIG. 8 depicts an illustrative distributed computing environment 800 capable of executing the software components described herein for a derivative work data blockchain. Thus, the distributed computing environment 800 illustrated in FIG. 8 can be utilized to execute many aspects of the software components presented herein. For example, the distributed computing environment 800 can be utilized to execute one or more aspects of the software components described herein. Also, the distributed computing environment 800 may represent components of the distributed blockchain platform discussed above.

According to various implementations, the distributed computing environment 800 includes a computing environment 802 operating on, in communication with, or as part of the network 804. The network 804 may be or may include the network 556, described above. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A, such as a laptop computer, a desktop computer, or other computing device; a slate or tablet computing device ("tablet computing device") 806B; a mobile computing device 806C such as a mobile telephone, a smart phone, an on-board computer, or other mobile computing device; a server computer 806D; and/or other devices 806N, which can include a hardware security module. It should be understood that any number of devices 806 can communicate with the computing environment 802. Two example computing architectures for the devices 806 are illustrated and described herein with reference to FIGS. 7 and 8. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for derivative work data blockchain ledgers. It should be understood that this configuration is illustrative only and should not be construed as being limiting in any way.

According to various implementations, the application servers 808 also include one or more original work data management services 818, derivative work data management services 820, and one or more blockchain services 822. The original work data management services 818 can include services for managing original work data on a blockchain, such as storing original work data in a modified Merkle-Patricia trie structure on derivative work data blockchain 140 in FIG. 1. The derivative work data management services 820 can include services for managing derivative work data on a blockchain, such as derivative work data blockchain 140 in FIG. 1. The blockchain services 822 can include services for participating in management of one or more blockchains, such as by creating genesis blocks, transaction blocks, and performing validation.

As shown in FIG. 8, the application servers 808 also can host other services, applications, portals, and/or other resources ("other resources") 824. The other resources 824 can include, but are not limited to, data encryption, data sharing, or any other functionality.

As mentioned above, the computing environment 802 can include data storage 810. According to various implementations, the functionality of the data storage 810 is provided by one or more databases or data stores operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826"). The datastores 826 are configured to host data used or created by the application servers 808 and/or other data. Aspects of the datastores 826 may be associated with services for a derivative work data blockchain. Although not illustrated in FIG. 8, the datastores 826 also can host or store web page documents, word documents, presentation documents, data structures, algorithms for execution by a recommendation engine, and/or other data utilized by any application program or another module.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 may provide the software functionality described herein as a service to the clients using devices 806. It should be understood that the devices 806 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 800 to utilize the functionality described herein for creating and supporting derivative work data blockchain ledgers, among other aspects.

Figure 9:
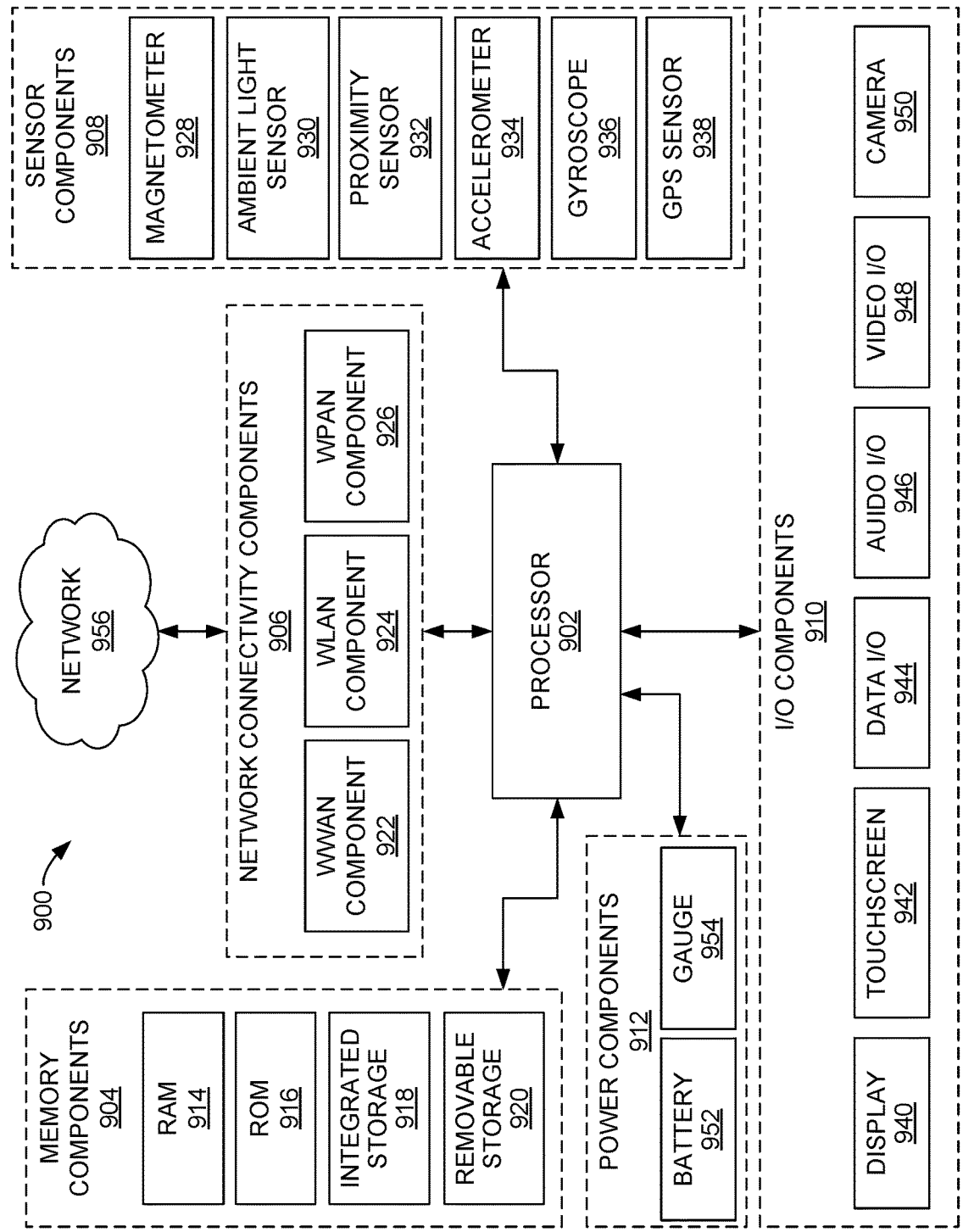
FIG. 9 is a computer architecture diagram illustrating a computing device architecture for a computing device capable of implementing aspects of the techniques and technologies presented herein.

Turning now to FIG. 9, an illustrative computing device architecture 900 for a computing device that is capable of executing various software components is described herein for derivative work data blockchain ledgers. The computing device architecture 900 is applicable to computing devices that can manage derivative work data blockchain ledgers. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 900 is applicable to the servers 110 and 120A-C shown in FIG. 1 and computing device 806A-N shown in FIG. 8.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, secure data.

In some configurations, the processor 902 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, California and others. In some configurations, the processor 902 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSOFT AZURE from Microsoft Corporation of Redmond, Washington or AWS from Amazon Corporation of Seattle, Washington The operating system may also include WINDOWS MOBILE OS from Microsoft Corporation of Redmond, Washington, WINDOWS PHONE OS from Microsoft Corporation, WINDOWS from Microsoft Corporation, PALM WEBOS from Hewlett-Packard Company of Palo Alto, California, BLACKBERRY OS from Research In Motion Limited of Waterloo, Ontario, Canada, MAC OS or IOS from Apple Inc. of Cupertino, California, and ANDROID OS from Google Inc. of Mountain View, California Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or be adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined.

The I/O components 910 may include discrete processors configured to support the various interfaces described below or may include processing functionality built-in to the processor 902.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The power components 912 may also include a power connector, which may be combined with one or more of the aforementioned I/O components 910. The power components 912 may interface with an external power system or charging equipment via an I/O component.

Examples of Various Implementations

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following examples:

Clause 1. A computer-implemented method for storing original work data and managing derivative work data, the method comprising: receiving original work data; storing the original work data in a blockchain; receiving second work data and proof data relating to whether the second work data is a derivative of the original work data; in response to receiving the second work data: verifying the received proof data by validating the second work data is a derivative of the original work data, appending the second work data to the blockchain, and storing the received proof data in the blockchain in association with the original work data.

Clause 2. The computer-implemented method of Clause 1, where the original work data comprises at least one of: source code, object code, an executable, literary text, an audio file, an image file, a video file, a graphical file, a biomedical/health/medical data record, a graphical model, a video game, and genetic data.

Clause 3. The computer-implemented method of Clause 1, where the step of verifying the received proof data by validating the second work data is a derivative of the original work data includes: transferring value to an entity from which the proof data is received.

Clause 4. The computer-implemented method of Clause 1, where: the step of storing the original work data in a blockchain includes, each of one or more portions of the original work data: calculating an entropy value for the portion of the original work, and storing the calculated entropy value in the blockchain in association with the portion of the original work data; and the step of verifying the received proof data by validating the second work is a derivative of the original work comprises: calculating an entropy value of at least a portion of the second work data, searching the stored entropy values in the blockchain for the one or more portions of the original work data for at least one stored entropy value that is within a threshold difference to the entropy value calculated for the portion of the second work data.

Clause 5. The computer-implemented method of Clause 4, where: the step of calculating a first entropy of at least a portion of the original work comprises: calculating a first entropy signature by analysis of subsets of data within the original work; and the step of calculating a second entropy of at least a portion of the second work comprises: calculating a second entropy signature by analysis of subsets of data within the second work; and the step of determining whether the second entropy is within a threshold difference to the first entropy comprises: comparing the first entropy signature to the second entropy signature to determine whether the second entropy signature is within the threshold difference to the first entropy signature.

Clause 6. The computer-implemented method of Clause 1, where the step of verifying the received proof data by validating the second work is a derivative of the original work includes: comparing one or more subsets of data in the original work to a subset of data in the second work; and determining whether a correlation between one of the subsets of data in the original work to the subset of data in the second work is within a correlation threshold.

Clause 7. The computer-implemented method of Clause 1, where the step of verifying the received proof data by validating the second work is a derivative of the original work comprises: inputting the original work data to a prediction model trained on differentiation of original works from derivative works; submitting the second work data to the prediction model; receiving an output prediction value from the prediction model for the second work data; and determining that the second work data is derivative of the original work data if the output prediction value meets a prediction threshold value.

Clause 8. The computer-implemented method of Clause 7, where the prediction model utilizes one or more of: a linear regression model, a logistic regression model, a decision tree, a support vector machine, a naïve Bayesian machine, k-means clustering, a gradient booting algorithm, a convolution neural network, a recurrent neural network, and a multi-instance learning algorithm.

Clause 9. The computer-implemented method of Clause 1, where: the proof data comprises a first data fingerprint of the original work and a second data fingerprint corresponding to the second work; and the step of verifying the received proof data by validating the second work is a derivative of the original work comprises determining whether the second data fingerprint is within a similarity threshold to the first data fingerprint.

Clause 10. The computer-implemented method of Clause 1, where the step of storing the original work data in a blockchain comprises: storing the original work data in a data structure that includes at least one of a Merkle tree, a Patricia trie, or a modified Merkle Patricia trie; and storing the data structure in the blockchain.

Clause 11. A system for storing original work data and managing derivative work data, the system comprising: one or more processors; and one or more memory devices in communication with the one or more processors, the memory devices having computer-readable instructions stored thereupon that, when executed by the processors, cause the processors to operate by: receiving original work data; storing the original work data in a blockchain; receiving second work data and proof data relating to whether the second work data is a derivative of the original work data; in response to receiving the second work data: verifying the received proof data by validating the second work data is a derivative of the original work data, appending the second work data to the blockchain, and storing the received proof data in the blockchain in association with the original work data.

Clause 12. The system of Clause 11, where the original work data comprises at least one of: source code, object code, an executable, literary text, an audio file, an image file, a video file, a graphical file, a biomedical/health/medical data record, a graphical model, a video game, and genetic data.

Clause 13. The system of Clause 11, where the operation of verifying the received proof data by validating the second work data is a derivative of the original work data includes: transferring value to an entity from which the proof data is received.

Clause 14. The system of Clause 11, where the operation of verifying the received proof data by validating the second work is a derivative of the original work includes: comparing one or more subsets of data in the original work to a subset of data in the second work; and determining whether a correlation between one of the subsets of data in the original work to the subset of data in the second work is within a correlation threshold.

Clause 15. The system of Clause 11, where the operation of verifying the received proof data by validating the second work is a derivative of the original work includes comprises: inputting the original work data to a prediction model trained on differentiation of original works from derivative works; submitting the second work data to the prediction model; receiving an output prediction value from the prediction model for the second work data; and determining that the second work data is derivative of the original work data if the output prediction value meets a prediction threshold value.

Clause 16. One or more computer readable storage media having computer executable instructions stored thereon which, when executed by one or more processors, cause the processors to execute a method for storing original work data and managing derivative work data comprising operations for: receiving original work data; storing the original work data in a blockchain; receiving second work data and proof data relating to whether the second work data is a derivative of the original work data; in response to receiving the second work data: verifying the received proof data by validating the second work data is a derivative of the original work data, appending the second work data to the blockchain, and storing the received proof data in the blockchain in association with the original work data.

Clause 17. The computer readable storage media of Clause 16, where: the operation of storing the original work data in a blockchain includes, each of one or more portions of the original work data: calculating an entropy value for the portion of the original work, and storing the calculated entropy value in the blockchain in association with the portion of the original work data; and the operation of verifying the received proof data by validating the second work is a derivative of the original work comprises: calculating an entropy value of at least a portion of the second work data, searching the stored entropy values in the blockchain for the one or more portions of the original work data for at least one stored entropy value that is within a threshold difference to the entropy value calculated for the portion of the second work data.

Clause 18. The computer readable storage media of Clause 16, where: the operation of calculating a first entropy of at least a portion of the original work comprises: calculating a first entropy signature by analysis of subsets of data within the original work; and the operation of calculating a second entropy of at least a portion of the second work comprises: calculating a second entropy signature by analysis of subsets of data within the second work; and the operation of determining whether the second entropy is within a threshold difference to the first entropy comprises: comparing the first entropy signature to the second entropy signature to determine whether the second entropy signature is within the threshold difference to the first entropy signature.

Clause 19. The computer readable storage media of Clause 16, where: the proof data comprises a first data fingerprint of the original work and a second data fingerprint corresponding to the second work; and the operation of verifying the received proof data by validating the second work is a derivative of the original work comprises determining whether the second data fingerprint is within a similarity threshold to the first data fingerprint.

Clause 20. The computer readable storage media of Clause 16, where the operation of storing the original work data in a blockchain comprises: storing the original work data in a data structure that includes at least one of a Merkle tree, a Patricia trie, or a modified Merkle Patricia trie; and storing the data structure in the blockchain.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

The invention claimed is:

1. A computer-implemented method comprising:
    storing, in a blockchain, first data for an original work, the original work comprising content generated by a first entity;
    receiving second data for a second work, the second work comprising content generated by a second entity;
    executing code on the blockchain to verify that the content of the second work is derived from the content of the original work based on first derivation validation data generated from the content of the original work and second derivation validation data generated from the content of the second work; and
    responsive to verifying the content of the second work is derived from the content of the original work, appending the second data to the blockchain.

2. The computer-implemented method of claim 1, wherein the content of the original work comprises at least one of: source code, object code, an executable, literary text, an audio file, an image file, a video file, a graphical file, a biomedical/health/medical data record, a graphical model, a video game, and genetic data.

3. The computer-implemented method of claim 1, wherein executing code on the blockchain to verify that the content of the second work is derived from the content of the original work based on the first derivation validation data and the second derivation validation data comprises:
    receiving the second derivation validation data from an entity; and
    transferring a value to the entity from which the second derivation validation data is received.

4. The computer-implemented method of claim 1, wherein the first derivation validation data comprises an entropy value for each of one or more portions of the content of the original work and the second derivation validation data comprises an entropy value for each of one or more portions of the content of the second work, and wherein executing code on the blockchain to verify that the content of the second work is derived from the content of the original work based on the first derivation validation data and the second derivation validation data comprises:
    determining the entropy value for at least one of the one or more portions of the content of the original work is within a threshold difference to the entropy value for at least one of the one or more portions of the content of the second work.

5. The computer-implemented method of claim 4, wherein the method further comprises:
    calculating a first entropy value for a first portion of the content of the original work by calculating a first entropy signature by analysis of subsets of data within the original work;
    calculating a second entropy value for a first portion of the content of the second work by calculating a second entropy signature by analysis of subsets of data within the second work; and
    wherein the second entropy value is determined to be within the threshold difference to the first entropy value by comparing the first entropy signature to the second entropy signature to determine whether the second entropy signature is within the threshold difference to the first entropy signature.

6. The computer-implemented method of claim 1, wherein executing code on the blockchain to verify that the content of the second work is derived from the content of the original work based on the first derivation validation data and the second derivation validation data comprises:
    comparing one or more subsets of data in the original work to a subset of data in the second work; and
    determining whether a correlation between one of the subsets of data in the original work to the subset of data in the second work is within a correlation threshold.

7. The computer-implemented method of claim 1, wherein executing code on the blockchain to verify that the content of the second work is derived from the content of the original work based on the first derivation validation data and the second derivation validation data comprises:
    inputting the first data to a prediction model trained on differentiation of original works from derivative works;
    submitting the second data to the prediction model;
    receiving an output prediction value from the prediction model for the second data; and
    determining that the content of the second work is derived from the content of the original work based on the output prediction value meeting a prediction threshold value.

8. The computer-implemented method of claim 7, wherein the prediction model utilizes one or more of: a linear regression model, a logistic regression model, a decision tree, a support vector machine, a naïve Bayesian machine, k-means clustering, a gradient booting algorithm, a convolution neural network, a recurrent neural network, and a multi-instance learning algorithm.

9. The computer-implemented method of claim 1, wherein the first derivation validation data comprises a first data fingerprint of the original work and the second derivation validation data comprises a second data fingerprint of the second work; and wherein executing code on the blockchain to verify that the content of the second work is derived from the content of the original work based on the first derivation validation data and the second derivation validation data comprises determining whether the second data fingerprint is within a similarity threshold to the first data fingerprint.

10. The computer-implemented method of claim 1, wherein storing the first data for the original work in the blockchain comprises:

storing the first data in a data structure that includes at least one of a Merkle tree, a Patricia trie, or a modified Merkle Patricia trie; and storing the data structure in the blockchain.

11. One or more non-transitory computer readable storage media storing computer-useable instructions that, when used by one or more processors, cause the one or more processors to perform operations, the operations comprising:

storing, in a blockchain, first data for an original work, the original work comprising content generated by a first entity;

receiving second data for a second work, the second work comprising content generated by a second entity;

executing code on the blockchain to verify that the content of the second work is derived from the content of the original work based on first derivation validation data generated from the content of the original work and second derivation validation data generated from the content of the second work; and responsive to verifying the content of the second work is derived from the content of the original work, appending the second data to the blockchain.

12. The non-transitory computer readable storage media of claim 11, wherein the content of the original work comprises at least one of: source code, object code, an executable, literary text, an audio file, an image file, a video file, a graphical file, a biomedical/health/medical data record, a graphical model, a video game, and genetic data.

13. The non-transitory computer readable storage media of claim 11, wherein executing code on the blockchain to verify that the content of the second work is derived from the content of the original work based on the first derivation validation data and the second derivation validation data comprises:

transferring a value to an entity from which the second derivation validation data is received.

14. The non-transitory computer readable storage media of claim 11, wherein executing code on the blockchain to verify that the content of the second work is derived from the content of the original work based on the first derivation validation data and the second derivation validation data comprises:

comparing one or more subsets of data in the original work to a subset of data in the second work; and determining whether a correlation between one of the subsets of data in the original work to the subset of data in the second work is within a correlation threshold.

15. The non-transitory computer readable storage media of claim 11, wherein executing code on the blockchain to verify that the content of the second work is derived from the content of the original work based on the first derivation validation data and the second derivation validation data comprises:

inputting the first data to a prediction model trained on differentiation of original works from derivative works;

submitting the second data to the prediction model;

receiving an output prediction value from the prediction model for the second data; and determining that the content of the second work is derived from the content of the original work based on the output prediction value meeting a prediction threshold value.

16. A computer system comprising:

one or more processors; and one or more non-transitory machine-readable media storing computer-useable instructions that cause the processors to perform operations comprising:

storing, in a blockchain, first data for an original work, the original work comprising content generated by a first entity;

receiving second data for a second work, the second work comprising content generated by a second entity;

executing code on the blockchain to verify that the content of the second work is derived from the content of the original work based on first derivation validation data generated from the content of the original work and second derivation validation data generated from the content of the second work; and responsive to verifying the content of the second work is derived from the content of the original work, appending the second data to the blockchain.

17. The computer system of claim 16, wherein the first derivation validation data comprises an entropy value for each of one or more portions of the content of the original work and the second derivation validation data comprises an entropy value for each of one or more portions of the content of the second work, and wherein executing code on the blockchain to verify that the content of the second work is derived from the content of the original work based on the first derivation validation data and the second derivation validation data comprises: comprises:

determining the entropy value for at least one of the one or more portions of the content of the original work is within a threshold difference to the entropy value for at least one of the one or more portions of the content of the second work.

18. The computer system of claim 17, wherein the operations further comprise:

calculating a first entropy value for a first portion of the content of the original work by calculating a first entropy signature by analysis of subsets of data within the original work;

calculating a second entropy value for a first portion of the content of the second work by calculating a second entropy signature by analysis of subsets of data within the second work; and wherein the second entropy value is determined to be within the threshold difference to the first entropy value by comparing the first entropy signature to the second entropy signature to determine whether the second entropy signature is within the threshold difference to the first entropy signature.

19. The computer system of claim 16, wherein the first derivation validation data comprises a first data fingerprint of the original work and the second derivation validation data comprises a second data fingerprint of the second work; and wherein executing code on the blockchain to verify that the content of the second work is derived from the content of the original work based on the first derivation validation data and the second derivation validation data comprises determining whether the second data fingerprint is within a similarity threshold to the first data fingerprint.

20. The computer system of claim 16, wherein storing the first data for the original work in the blockchain comprises:
   storing the first data in a data structure that includes at least one of a Merkle tree, a Patricia trie, or a modified Merkle Patricia trie; and
   storing the data structure in the blockchain.

* * * * *